US005495111A

United States Patent [19]
Thurston et al.

[11] Patent Number: 5,495,111
[45] Date of Patent: Feb. 27, 1996

[54] CRYSTAL ARRAY BASED LOCALIZER FOR TISSUE SAMPLING

[75] Inventors: Marlin O. Thurston, Columbus; Karl W. Olson, Worthington, both of Ohio

[73] Assignee: Neoprobe Corporation, Dublin, Ohio

[21] Appl. No.: 329,319

[22] Filed: Oct. 26, 1994

[51] Int. Cl.⁶ ........................................... G01T 1/24
[52] U.S. Cl. .................. 250/370.1; 250/370.01; 250/394; 250/336.1
[58] Field of Search .................. 250/370.1, 370.01, 250/393, 394, 336.1

[56] References Cited

U.S. PATENT DOCUMENTS

| | | | |
|---|---|---|---|
| 3,569,711 | 3/1971 | Stoms et al. | 250/394 |
| 5,301,671 | 4/1994 | Leighton et al. | 250/370.01 |
| 5,429,133 | 7/1995 | Thurston et al. | 250/370.01 |

*Primary Examiner*—Carolyn E. Fields
*Attorney, Agent, or Firm*—Mueller and Smith

[57] ABSTRACT

Intended for use in a pathology laboratory, the apparatus includes a multi-segment crystal array over which is positioned a platform supported receiving region with a pattern carrying indicia emulating and in registry with the pattern of the crystal array segments. The tissue carrying a radiolabeled locator is positioned on the receiving region and the photon emission count values for each segment are compiled and displayed at a computer monitor or as a print-out in conjunction with crystal segment identification. Observation of the count values by a pathologist then shows the location over a segment of highest count value at which locator is more likely to be concentrated. Sectioning then is carried out at that location.

21 Claims, 30 Drawing Sheets

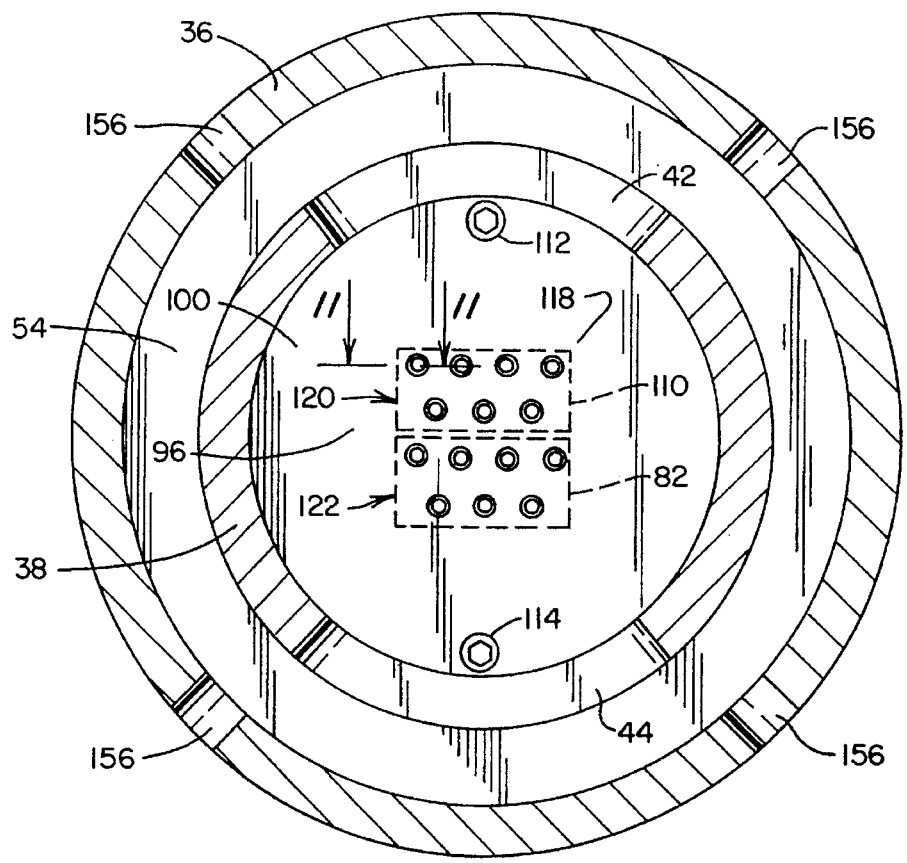
FIG. 10
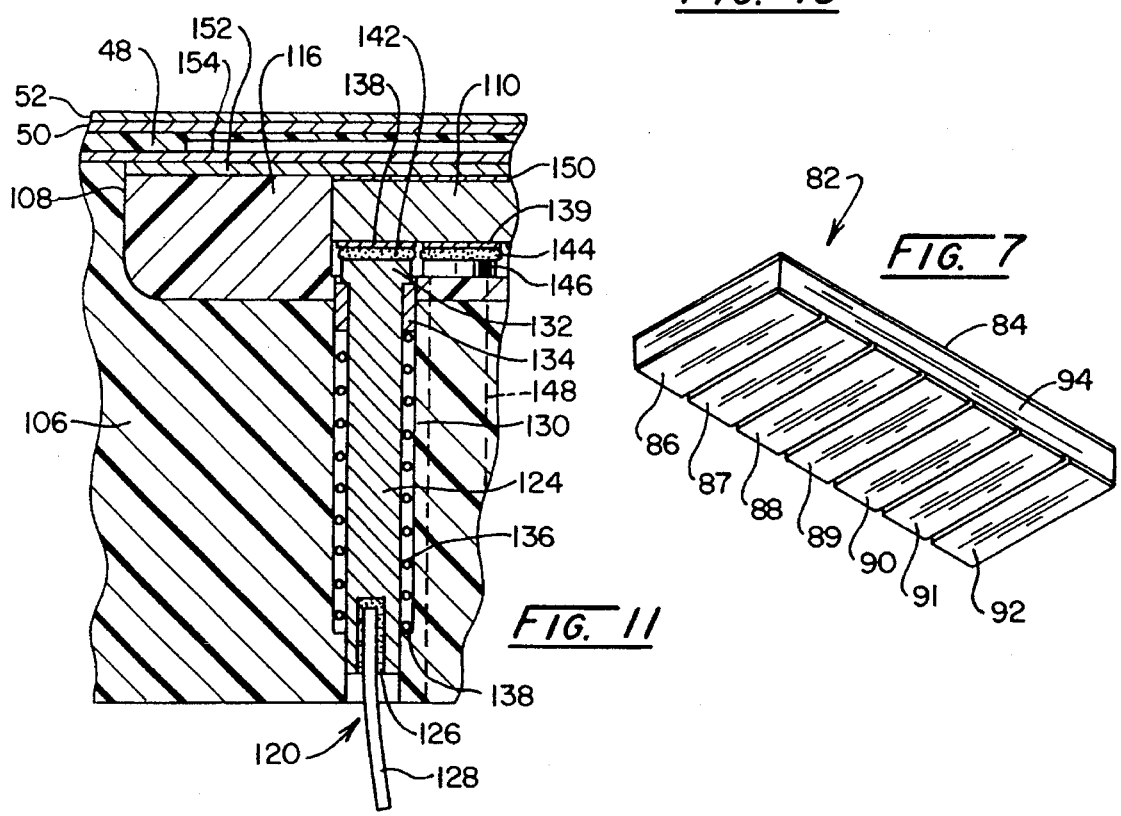
FIG. 11
FIG. 7

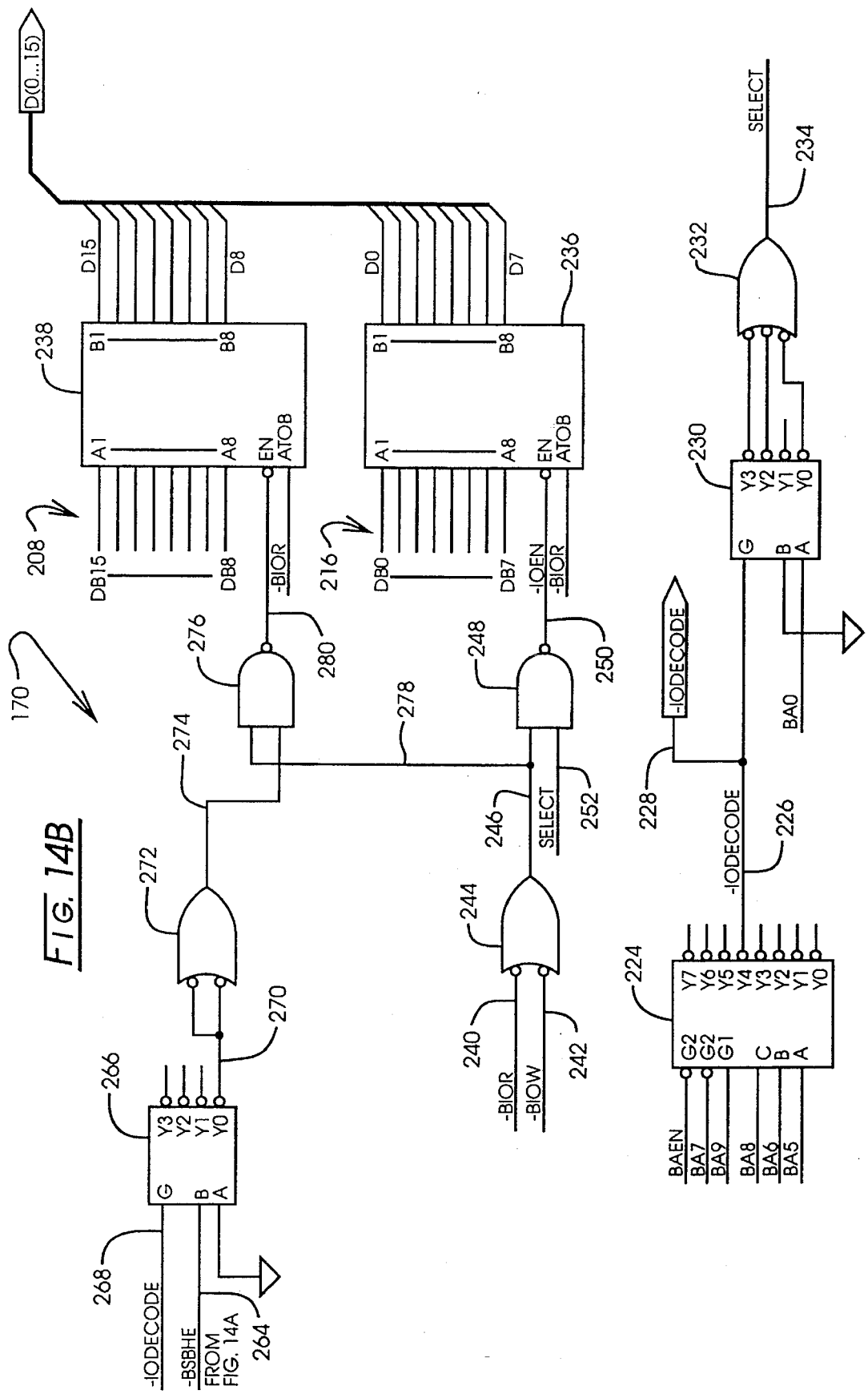

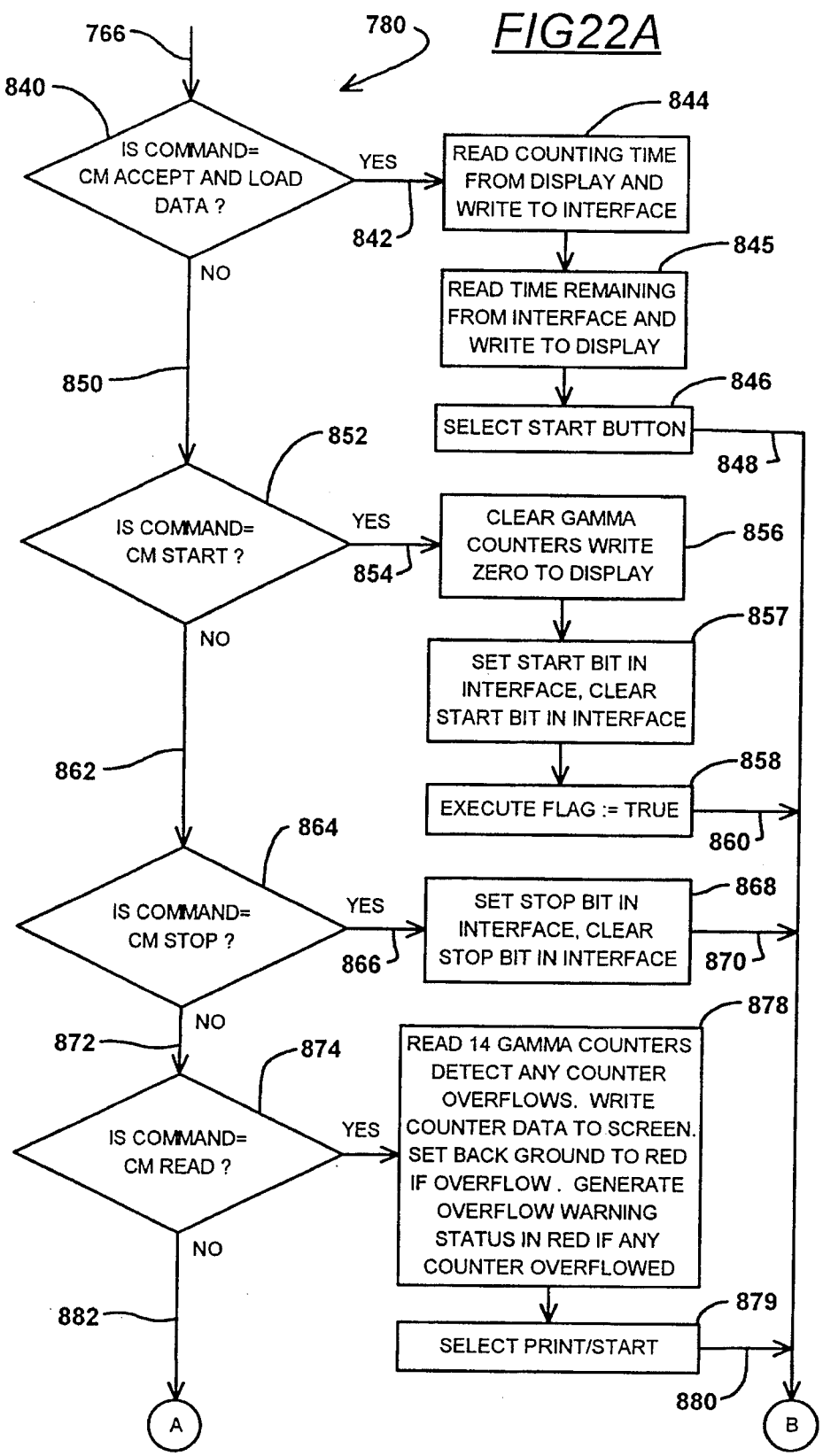

CRYSTAL ARRAY BASED LOCALIZER FOR TISSUE SAMPLING

BACKGROUND OF THE INVENTION

Current and historical procedures for the treatment of colon and rectal cancer have been based, for staging purposes, upon the natural history of tumor spread, and thence, upon operative and non-operative options. Operative options generally have looked to the physical location and surgical resection of tumor. A variety of techniques have been brought to bear in the art with the purpose of aiding the surgeon in detecting and localizing neoplastic tissue as part of this surgical procedure. ("Neoplastic tissue", for present purposes, often is referred to as cancerous tissue, though malignant tumor and malignant tumor cells also are found in the terminology of the art. The term "neoplastic tissue" includes all of these.) A substantial amount of effort in aiding the surgeon in locating neoplastic tissue has been through the utilization of radiolabeled antibody for detection purposes For example, one technique includes the scintillation scanning of patients injected with relatively high energy, e.g. $^{131}$I labeled antibodies. Such photoscanning or scintillation scanning provides scintigrams difficult to interpret because of blood pool background radioactivity. Computer subtraction of radioactive blood pool agents and the use of two labeled antibodies (one specific for the tumor and one non-specific) have been attempted to enhance imaging. Nevertheless, such techniques have been found to provide little, if any, useful information to the surgeon, especially over and above CAT scans, magnetic resonance imagings, and like traditional techniques. Typically, large tumor is readily located by the surgeon by visualization at the operating theater and, in particular, through palpation, i.e. the feel of a tumor as opposed to that of normal tissue. To achieve operative success, however, it is necessary for the surgeon to somehow locate "occult" tumor, i.e. tumor which cannot be found by the conventional surgical procedures of sight and feel. Failure to locate and remove such occult tumor generally will result in the continued growth of cancer in the patient, a condition often referred to as "recurrent" cancer. In general, conventional diagnostic techniques as, for example, use of the classic gamma camera and the like, fail to find or locate occult tumor. As tumor sites become smaller, the radionucleide concentrations at given tumor site will tend to be lost, from an imaging standpoint, in the background where blood pool radiation necessarily is present in the patient.

U.S. Pat. No. 4,782,840 by Martin, M.D. and Thurston, Ph.D., entitled "Method for Locating, Differentiating, and Removing Neoplasms", issued Nov. 8, 1988 (the disclosure of which is expressly incorporated herein by reference) reviews such scintillation scanning techniques and discloses a much improved method for locating, differentiating, and removing neoplasms. Such technique utilizes a radiolabeled antibody and a portable radiation detection probe which the surgeon may use intraoperatively in order to detect sites of radioactivity. Because of the proximity of the detection probe to the labeled antibody, the faint radiation emanating from occult sites becomes detectable, for example, in part because of the inherent application of the approximate inverse square law of radiation propagation. The procedure is known as the RIGS system (RIGS being a trademark of Neoprobe Corporation, Columbus, Ohio) and is successful additionally because of a recognition that tumor detection should be delayed until the blood pool background of circulating radiolabeled antibody has had an opportunity to be cleared from the body. As a consequence, the photon emissions or radiation emitted by minor tumors compared to surrounding tissue becomes detectable in view of the proximity of the probe device to it. Fortuitously, the '840 patent discloses the ability of the radiolabeled antibody to remain bound to or associated with neoplastic tissue for extended periods of time with the radio tag still bound thereto. Moreover, even though the accretion of radioactivity at the tumor site decreases over time, the blood pool background and surrounding tissue (relative to the tumor sites) decrease at a much greater rate so that the radioactive sites can be determined readily utilizing a hand held probe positioned in close proximity with the tissue under investigation.

A highly important aspect of all procedures associated with colorectal and other cancers resides in the proper staging of the patient according to the extent and severity of the disease. Such staging aids in determining the appropriate post-surgical treatment for such patients. Stage I and II patients are believed to be curable by surgery alone, whereas Stage III patients, i.e. patients determined to have cancer spread to the lymph nodes, are treated with some form of post-operative therapy, such as chemotherapy. Stage IV patients, i.e. patients with metastisis to other organs, are treated with a variety of methods, including post-surgical therapy and/or surgical removal of the primary tumor. More severe metastisis typically is not deemed to be treatable by surgery and thus, surgery is not undertaken in order to spare the patients unnecessary trauma. Where the above-noted hidden or occult cancer is not found, residual disease is left behind and is not accounted for with respect to an evaluation of the extent of the disease to determine proper post-surgical therapy.

Colorectal cancer may spread by local invasion, lymphatic extension, hematogenous spread, or implantation. After the initial mucosal growth, a tumor may progress locally in several directions, but usually it protrudes first into the lumen. Mural penetration may result in local failure or peritoneal seeding.

Colorectal cancer first metastasizes to the perirectal nodes at the level of the primary tumor or immediately above it. Next, the chain accompanying the superior hemorrhoidal vessels is involved. In later stages of disease, when the hemorrhoidal lymphatics are blocked, there is lateral downward spread. In colon carcinoma, normal lymphatic flow is through the lymphatic channels along the major arteries, with three echelons of lymph nodes: pericolic, intermediate, and principal. If tumors lie between two major vascular pedicles, lymphatic flow may drain in either or both directions. If the central lymph nodes are blocked by tumor, lymphatic flow can become retrograde along the marginal arcades proximally and distally. The risk for lymph node metastases increases with increasing tumor grade, as does the number of lymph nodes affected.

The liver is the primary site of hematogenous metastases, followed by the lung. Involvement of other sites in the absence of liver or lung involvement is rare.

Implantation refers to the release of tumor cells from the primary tumor and their deposition on another surface. Implantation has been reported with tumor cells shed intraluminally, from the serosal surface through the peritoneum, and by surgical manipulation and resultant deposition on wound surfaces.

The contribution of RIGS-based surgery to enhancing the vision-based and touch-based procedures of the surgeon has been substantial. The detection and location approach of this system has permitted the identification and removal of hidden or occult tumor under conditions where otherwise conventional procedures would not have found it. Additionally, the system has been employed in staging, particularly in evaluating lymph nodes and other metastatic disease for staging procedures. The system has been demonstrated in clinical studies to substantially improve the staging of primary colorectal cancer patients which, having been staged by traditional means, were restaged to State III disease based upon the RIGS system as confirmed by pathology findings. As a consequence of such findings, patients so re-evaluated are eligible for post-surgical therapy, such as chemotherapy, resulting in improved patient management. The importance of such staging has been established in view of the National Institute of Health (NIH) consensus report concerning the administration of adjuvant chemotherapy to appropriately stage patients. "NIH Consensus Conference: Adjuvant Therapy for Patients with Colon and Rectal Cancer", *JAMA*, 1990; 264:1444–50.

The procedure carried out in the course of RIGS-based colorectal surgery involves, inter alia, a radionuclide survey of the lymph system and organs within the peritoneal cavity. Where a lymph node has been identified by the surgeon in the course of such survey by its association with a radiolabel in the course of surgery, it will be resected and immediately delivered to a tumor pathologist for intraoperative consultation. For this consultation, the pathologist typically carries out a somewhat standard technique which involves a sampling of the lymph node or tissue received, freezing, cutting of sections in a crystal, staining of those sections with hematoxylin-eosin or an equivalent stain, and examination under a microscope. Ideally, this procedure takes about five minutes per specimen, although extra time is allowed if multiple sections of specimens are to be examined. See in this regard, *Cancer, Principles & Practice of Oncology*, 4th Ed., vol. 1, p. 235, J.B. Lippincott Company, Philadelphia.

Because of the high sensitivity of the RIGS system, lymph node involvement may be identified at very early stages of colorectal cancer metastisis. This sensitivity may be occasioned by a form of biological amplification occurring wherein the radiolabeling system serves to identify sialomucin, a substance secreted by cancer involved cells, as opposed to the cells themselves. As a consequence, involved lymph nodes found positive by a radionuclide survey in the course of surgery which are delivered to the tumor pathologist may contain only a limited number of cancerous cells. Severely constrained by the time limitations of interoperative consultation, the pathologist often will not section a sample at the correct position and thus reports the resultant negative analysis to the surgeon. As is apparent, a technique is called for to aid the tumor pathologist in determining the proper location upon the specimen for carrying out sectioning with the highest probability of locating cell involvement in cancer.

SUMMARY

The present invention is addressed to apparatus, method, and system for locating the situs of photon emissions from a tissue sample such as a lymph node. The apparatus of the invention, which typically is utilized by a tumor pathologist, employs a radiation responsive crystal assembly formed as a plurality, for example 14, of discrete segments arranged in a pattern just below a thin platform assembly. That assembly is formed having a receiving region located over the crystal assembly upon which a tissue sample is placed. This platform is transparent or transmissive of photon emissions emanating from the sample and carries indicia in a pattern duplicating and in registry with the pattern of crystal segments. A signal treatment and photon event counting channel is established for each crystal segment. Following completion of a selected counting interval subsequent to the placement of a sample upon the receiving region, a control and compiling system, which may include a conventional PC form of computer and display provides a display output publishing the count value results for each of the segments. Preferably, this readout emulates the same pattern as exhibited by the segment assembly. By observing the count values in the readout, the pathologist may determine that location on the tissue sample which is over the crystal segment evidencing a highest count value. By observing the count values of an adjacent segment, the pathologist may evaluate at which position within the segment of highest count value, the source of radiation is most likely to be present. The tissue sample then may be marked, for example with a pen, and sectioned at that location utilizing conventional pathology procedure. The display may publish the count values for each segment in numerical fashion or, for example, in quickly perceived bar chart fashion. Additionally, a print-out of the count values for each segment is readily provided.

In a refinement of the methodology of the invention, two count intervals may be carded out for a tissue sample. The first of these count evaluations is as above-described with appropriate display and marking or observation of the most likely location of radiation source. Next, the tissue sample, without being lifted from the platform support, is repositioned at the receiving region in a second orientation rotated a select extent, preferably 90° with respect to the initial orientation. Then, a second evaluation is made and a location of the segment of highest count is observed. A simple intersective geometrical evaluation then develops a point positioning for the most likely location of the source of radiation or photon emission within the tissue sample. This dual count interval approach permits the utilization of larger crystal segments, for example having a width of 2 mm and a length of 7 mm for a total assembly surface of 196 square mm, with the output result of an array having a far greater number of segments, for example, 49 square, 2 mm×2 mm segments. The surface area is necessitated to achieve sufficiently rapid photon event counting. With the present arrangement only 14 signal treating channels with preamplifiers, evaluation networks, counters and the like are required as compared, for example, to 49.

Additional refinement may be provided at the expense of somewhat lengthier count intervals through the utilization of a collimator at the receiver region. This collimator, for example, may be employed with rectangular segments of a crystal assemblage wherein two arrays of such segments are provided in mutual adjacency. Collimation may be provided along the lengthwise extent of such two segments across two adjacent arrays.

Another feature of the invention is the provision of apparatus for locating the situs of photon emissions from a tissue sample. A radiation responsive crystal assembly is provided having a plurality of segments discretely responsive to the photon emissions, each with a lower disposed surface for providing a crystal output and an upwardly disposed surface for receiving the emissions, the segments being ganged in a predetermined pattern. A base assembly supports the crystal assembly segments at the lower disposed surface thereof and a platform assembly, transparent to the photon emissions, is positioned over the crystal assembly. The platform assembly has a receiving region for receiving the tissue sample which is located over the plurality of segments and has indicia identifying the location of each segment. A signal treatment network is responsive to the crystal output of each segment for deriving a segment specific pulse output corresponding with each valid photon emission from the tissue sample when that sample is positioned at the receiving region. A counting circuit responds in the presence of an enable input to count each segment specific pulse output to derive a segment count value and a control and compiling system is provided which is responsive to a start command for deriving the enable input. This system includes a timing network actuable with the start command for determining the time interval during which the segment count value is derived and is responsive to compile the segment count value for each segment and derive a visually perceptive readout of such compiled segment count values.

Another feature of the invention provides a method for locating the situs of photon emissions from a tissue sample which comprises the steps of:

providing a radiation responsive crystal assembly having a plurality of segments arranged in a predetermined pattern, each discretely responsive to the photon emissions interacting therewith to provide a segment specific output;

providing a radiation transmissive receiving region adjacent the crystal assembly having indicia identifying the location of each segment;

positioning the tissue sample at the receiving region in a given orientation;

providing a signal treatment network responsive to each segment specific output and deriving a segment specific pulse output corresponding with each valid photon emission from the tissue sample at the receiving region;

counting the number of segment specific pulse outputs occurring for a duration of sampling time to derive segment specific total count values;

displaying the segment specific total count values in conjunction with the indicia corresponding thereto; and determining the location of the situs in correspondence with the highest segment specific total count value for the given tissue sample orientation.

Another feature of the invention provides a system for locating the situs of photon emissions from the tissue sample which includes a radiation responsive crystal assembly having a plurality of segments discretely arranged in a predetermined pattern and which are responsive to the photon emissions interacting therewith to provide a segment specific output. A platform assembly is provided which is transparent to the photon emissions and is positioned over the crystal assembly. The platform assembly has a receiving region for receiving the tissue sample which is located over the plurality of segments and has indicia identifying the location of each segment. A signal treatment network is responsive to each segment specific output for deriving a segment specific pulse output corresponding with each valid photon emission from the tissue sample when positioned at the receiving region. A controller circuit is provided which is responsive to a clocking input and a synchronously assertable start and stop commands for respectively deriving an enable output synchronized with a clock input and a stop output. A timer circuit responds to the enable output to carry out a time interval measurement. A counter network is provided which includes a plurality of segment specific counters, each responsive in the presence of the interval output to count each segment specific pulse corresponding with the predetermined crystal assembly segment to provide a segment count value for each segment. A computer is provided including a display under the control of the computer. The computer includes an interface circuit coupled with the controller circuit, the timer circuit, and the counter network, and is responsive to a user input to derive the start and stop commands, and which compiles and displays each segment count value at the display.

Other objects of the invention will, in part, be obvious and will, in part, appear hereinafter. The invention, accordingly, comprises the apparatus, method, and system possessing the construction, combination of elements, steps, and arrangement of parts which are exemplified in the following description.

For a fuller understanding of the nature and objects of the invention, reference should be had to the following detailed description taken in connection with the accompanying drawings.

BRIEF DESCRIPTION OF THE DRAWINGS

FIG. 7 is a pictorial representation of a multi-segmented crystal array according to the invention;

FIG. 10 is a sectional view taken through the plane 10—10 shown in FIG. 8;

FIG. 11 is a partial sectional view taken through the plane 11—11 shown in FIG. 10;

FIGS. 14A and 14B, when combined, are a schematic diagram of the components of an interface block shown in FIG. 12;

FIG. 22A and 22B are flow charts describing the handle application commands block of FIG. 21A;

DETAILED DESCRIPTION OF THE INVENTION

Figure 1:
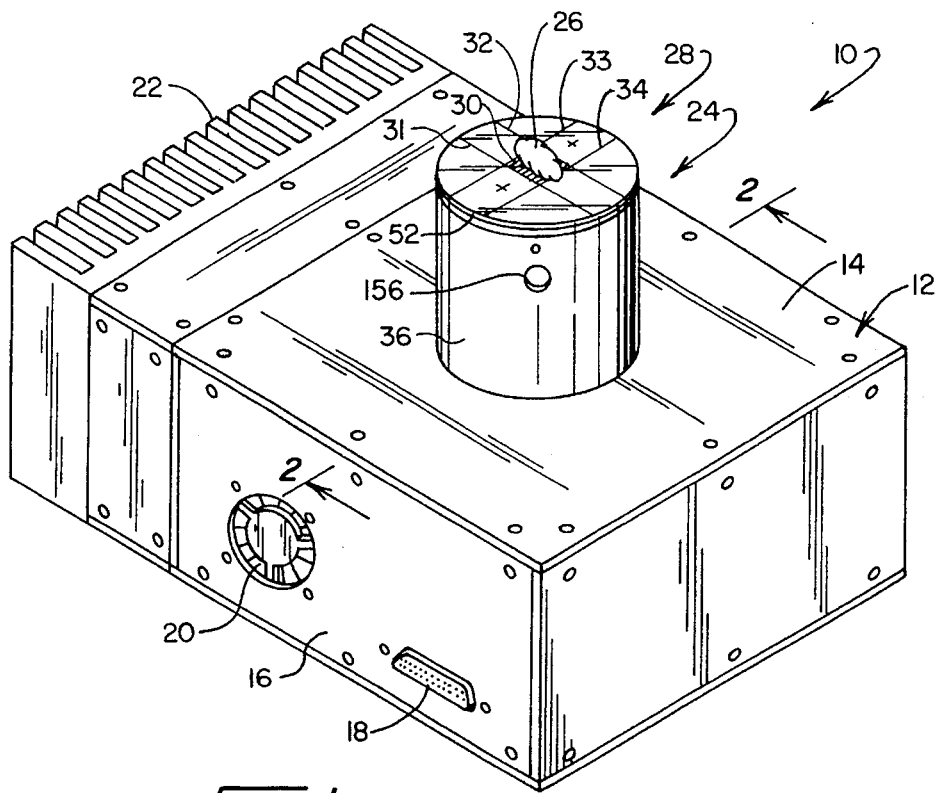
FIG. 1 is a pictorial view of apparatus according to the invention.

The apparatus and system of the invention is configured for utilization, for example, in the environment of a pathology laboratory which typically is located in the same hospital building as a surgical theater. So located, the system swiftly apprises the tumor pathologist as to the appropriate location for carrying out a sectioning of tissue such as a lymph node deemed positive by the RIGS technique in the course of surgery. Looking to FIG. 1, the apparatus is represented generally at 10 as including a rectangular base housing 12 having an upwardly disposed support surface 14. At a side 16 thereof there is mounted a multi-pin connector 18 which receives the connector component of a ribbon form of cable, connectable, in turn, to a conventional personal computer (PC) (not shown). In this regard, a computer utilizing an MSDOS system is suitable Side 16 also supports a small fan 20 functioning for electronic cooling purposes. Additionally employed for heat removal is a fin-like heat sink structure 22 coupled along an adjacent, power supply containing side of the base housing 12 and functioning for the purpose of dissipating heat generated electronically.

An upstanding cylindrically shaped base assembly represented generally at 24 is supported from surface 14. Assembly 24, in turn, supports a crystal assembly (not shown) formed of a plurality of segments responsive photoemissions from a tissue sample. The tissue sample, here represented at 26, is supported upon a platform assembly represented generally at 28 which, in turn, is supported upon the base assembly 24 over the noted crystal assembly. Tissue sample 26 is seen to be located upon a rectangular receiving region 30 identified by the intersection of orthogonally disposed paired alignment lines 31–34.

Figure 2:
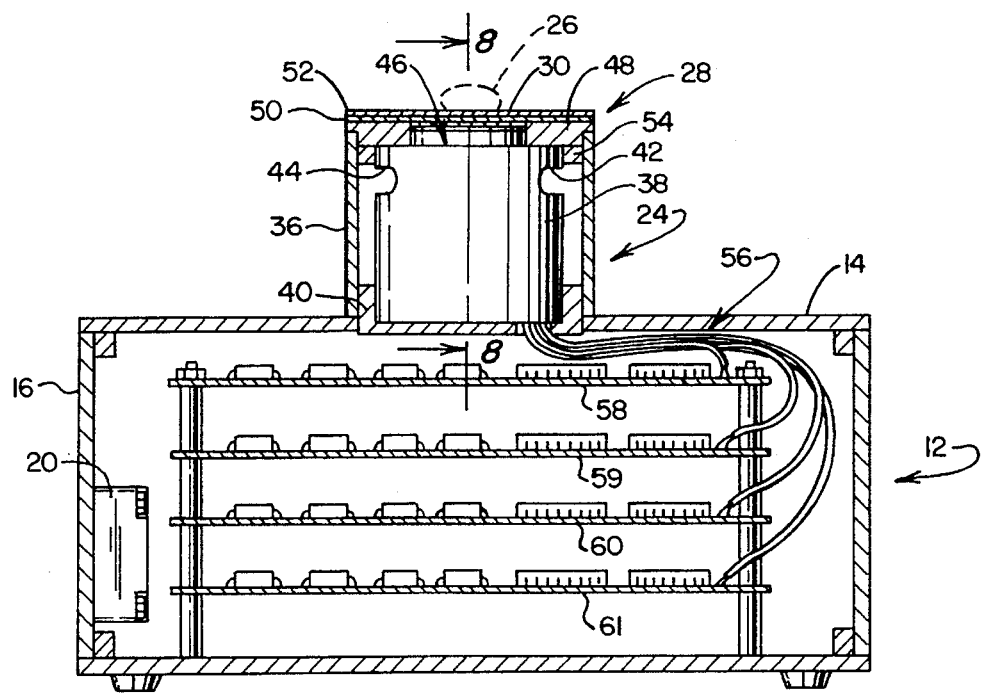
FIG. 2 is a sectional view taken through the plane 2—2 in FIG. 1.

Looking additionally to FIG. 2, the base assembly 24 is seen to be formed of an outer aluminum cylinder 36 within which is mounted an internally disposed brass support cylinder 38. Cylinder 38 is seen mounted within the internal cavity defined by a lower base cylinder 40, the outer cylindrical surface of which additionally is inserted within and aligns outer aluminum cylinder 36. Support cylinder 38 additionally is seen to be provided having access and air flow openings as at 42 and 44 which provide access to electrical connections between the segments of the crystal assembly and adjacent preamplification stages. An assembly of radiation responsive crystal segments are mounted within a crystal mount represented generally at 46 and supported at the upper portion of cylinder 42. Platform assembly 28 is positioned over the crystal mount 46 and is seen provided as a plastic disk or end cap 48, the upper surface of which supports a disk-shaped plastic protective cover 50 and a transparent plastic disposable sample support 52.

Attachment of the disk or end cap 48 with outer cylinder 36 is developed through a brass ring 54 which provides for appropriate coupling while avoiding any passageways extending through the top of component 48 which otherwise might receive fluid contaminants from the samples and the like prevelant within the environment of a pathology laboratory.

A grouping of four coaxial cables 56 are shown extending from brass cylinder 38 and through an opening in base cylinder 40 to the interior of base housing 12. Each of these cables carries a sequence of leads each representing the preamplified output of one of as many as four crystal segments. One of each of the cables then is coupled as an input to quad channel circuit boards which contain additional signal treatment networks as well as control networks and are shown at 58–61. The circuits provided at circuit boards 58–61 function to evaluate and pulse categorize photon emissions and carry out a discrete counting for each channel of a 14-segment crystal assembly. The geometric outer peripheral shape of this crystal assembly is square, being formed of 14 rectangular segments. Looking additionally to FIG. 3A, the disposable sample support 52 is illustrated in position over cover 50. Printed on this thin plastic disk as well as cover 50 at receiving region 30 is a unity scale, pictorial representation of the upper photon-receiving surface of each segment of the crystal assembly. Note in this regard that also printed on the support 52 are segment identifying numbers 1–14. This receiving region 30 is positioned over an identically printed indicia positioned upon the receiving region of protective cover 50. That indicia is carefully positioned over the crystal assembly such that the indicia or retical network precisely corresponds in registry with the upper surface of the crystal segments. Thus, each numbered segment will respond to photon emissions from a source such as represented by dot 62 in FIG. 3A in an amount somewhat corresponding to its distance from that photon emission source. For lymph node evaluation, two arrays of seven crystal segments have been employed. These arrays may be generally represented in FIG. 3A at 64 showing numbered segments 1–7 and at 65, representing numbered segments 8–14. With the arrangement, it may be observed that the point source dot 62 is over segment 12 of array 65 which, in turn, is adjacent to segment 5 within array 64. The joinder line between arrays 64 and 65 is represented at 66. It may be observed that the shape of each segment within arrays 64 and 65 is that of an elongate rectangle wherein the lengthwise dimension is greater than the widthwise dimension. This structuring develops a larger area for each segment which permits the development of a larger crystal surface area with a minimal number of segments to achieve a higher count rate per second while maintaining: proper position resolution. This feature of adequate total crystal area is important in order to minimize the amount of time required to get an adequate count evaluation. By contrast, should the segments be made square and smaller, then a substantially larger counting interval will be required. By making the segment shape that of an elongate rectangle, resolution of higher level is achieved in the narrow width of each segment. Utilizing a 90° repositioning approach, the shorter count interval advantages are retained with the concurrent advantage of substantial equivalency with a crystal assemblage having many more segments. In this regard, for example, a 49 segment crystal assembly would require a corresponding 49 preamplification, signal validation, and counter containing channels. Here, only 14 are required.

Figure 4:
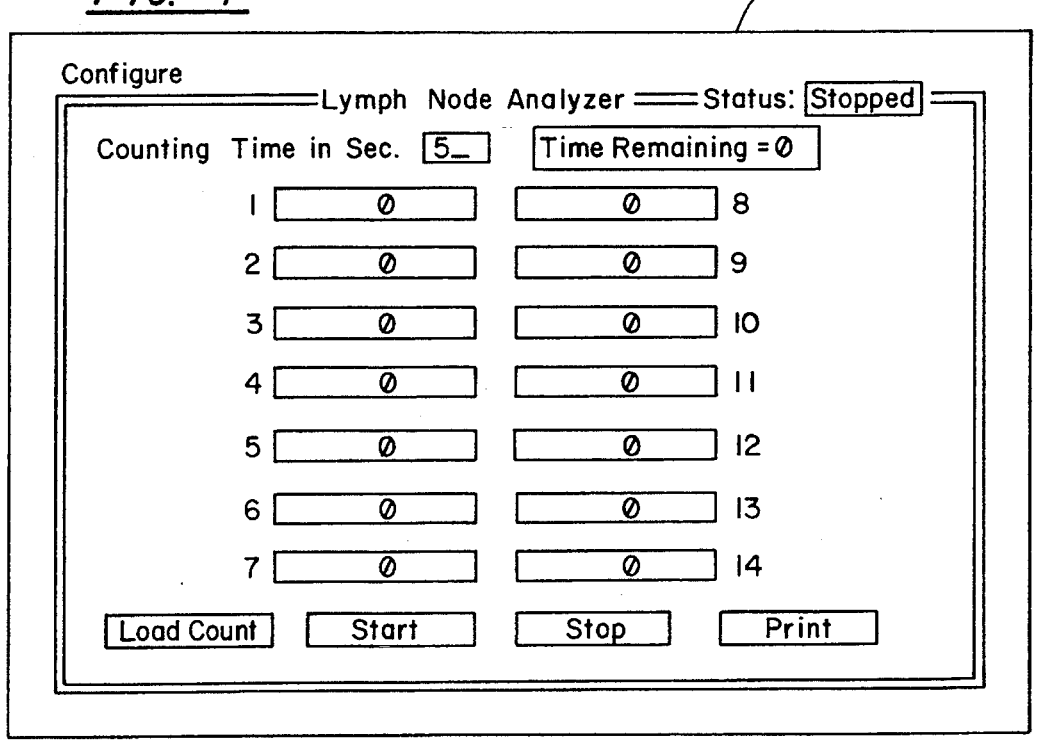
FIG. 4 is a front view of a computer monitor screen showing a readout according to the invention.

With the tissue sample 26 in place, and with the carrying out of appropriate start procedures, pulses are counted, for example, in the range of 30 seconds or greater, and the results of the counting then are transmitted to a personal computer (PC) for numerical readout. In this regard, looking to FIG. 4, a PC monitor screen 68 providing such readout is depicted but with zero value counts. Note that the particular array at receiving region 30 is, in a sense, replicated by fourteen blocks, each carrying the same segment identifying numeration as provided on the cover 50 and disposable support 52. By observing the count valuations in the numerical blocks, the user will know at which location on a segment or along which segments the photon source is most likely to be present as a result of the approximate inverse square law of radiation propagation. Counting may be carried out for predetermined intervals of time or until such time as a certain desired maximum count level is realized. With such information, the tumor pathologist will have highly valuable data as to the appropriate location for carrying out a sectioning. Typically, the tissue sample 26 is marked with a pen at the location representing maximum count output, following which, freezing and sectioning takes place.

Figure 5A:
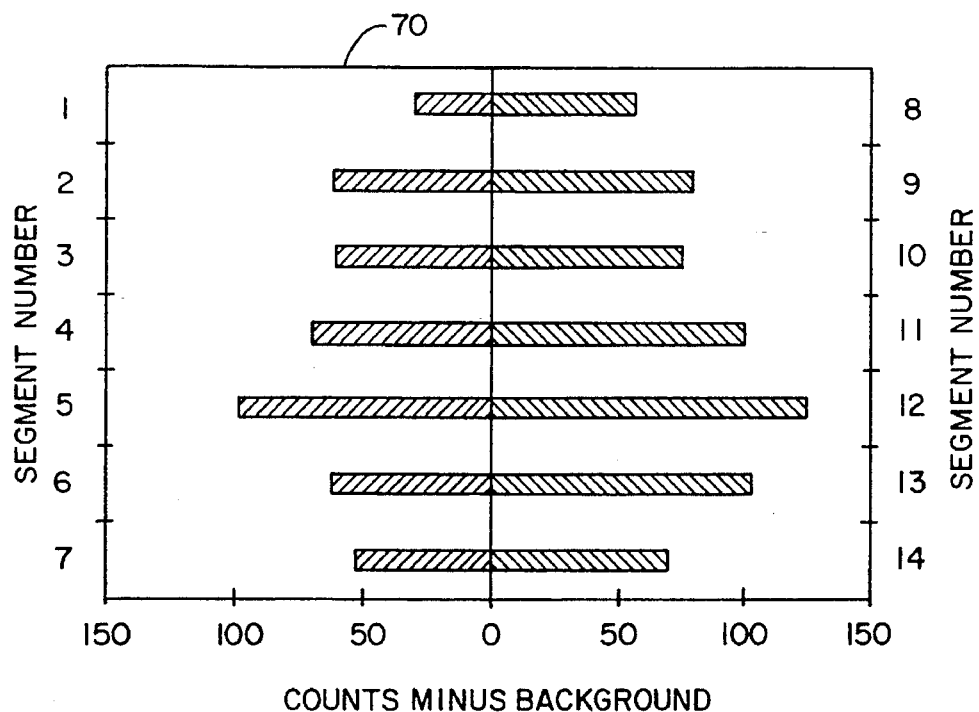
FIG. 5A is a representation of a monitor screen readout representing operation of the invention.

FIG. 5A shows a representation of an alternative or supplementary readout as a screen 70 wherein count numerical data is provided in oppositely directed horizontal bar chart form corresponding with a point source 62 located over segment 12 near the joinder line 66 between segment arrays 64 and 65. For the display shown, the pathologist will recognize that the photon emissions most probably are generated over the sector 12 region and more likely will be at a position adjacent the joinder line 66.

The response of segment arrays 64 and 65 to a point source of radiation can be computed with respect to each of the segments as a demonstration of the technique for source location identification. Referring to FIGS. 6A–6D, a graphical representation of such computations is presented for a 4 nanoCurie point source which is located over array 64 and, more particularly, over the widthwise center of segment 4 of array 64 and for different locations along the lengthwise extent of that segment 4. Such location is represented by the small inset within the drawing. For purposes of the computation, the point source is considered to be positioned 3 mm above the widthwise center of segment 4. For purposes of FIG. 6A, the point source at the noted height is located 5 mm from joinder line 66 toward the outside of segment 4. In the figure, counts occurring within 20 seconds are identified as along a vertical ordinate, while the horizontal distance in millimeters along the lengthwise extent of array 64 is plotted as curve 72, with segment 4 being represented at 0 and segment 1 being represented at −6 mm, while segment 7 is located at the distance +6 mm. Correspondingly, curve 73 represents relative distribution of counts along array 65 with segment 11, the segment next adjacent segment 4, being represented at 0 distance; segment 8 being represented at −6 mm distance, and segment 14 being represented at +6 mm distance. Observing curves 72 and 73, one can immediately perceive that the point source is over segment 4, inasmuch as that is where the highest number of counts are, for example about 170. Additionally, it can be discerned that the point source is quite far from the joinder line 66 because of the low level counts represented at curve 73, and particularly with respect to adjacent segment 11 which is located at the noted 0 distance position. In FIG. 6B, the point source is moved to a distance 3.5 mm from the joinder line 66 and thus is over the longitudinal center of segment 4. Such positioning is represented at the small inset within the drawing. This creates curve 74 for array 64 showing that the number of counts derived from segment 4 has risen to about 182. The relative distribution for array 65 is shown at curve 75 indicating that the count level at segment 11 or the 0 distance position is about 30 counts, a higher number than the corresponding segment 11 count output represented by curve 73. The higher count for segment 4 shown for FIG. 6B is representative, inasmuch as the point source is at the closest average distance to all parts of this segment. Of course, the reason that there is no proportionality involved with the count outputs resides in the attributes of the inverse square law of distribution of radiation emission.

Figure 6A:
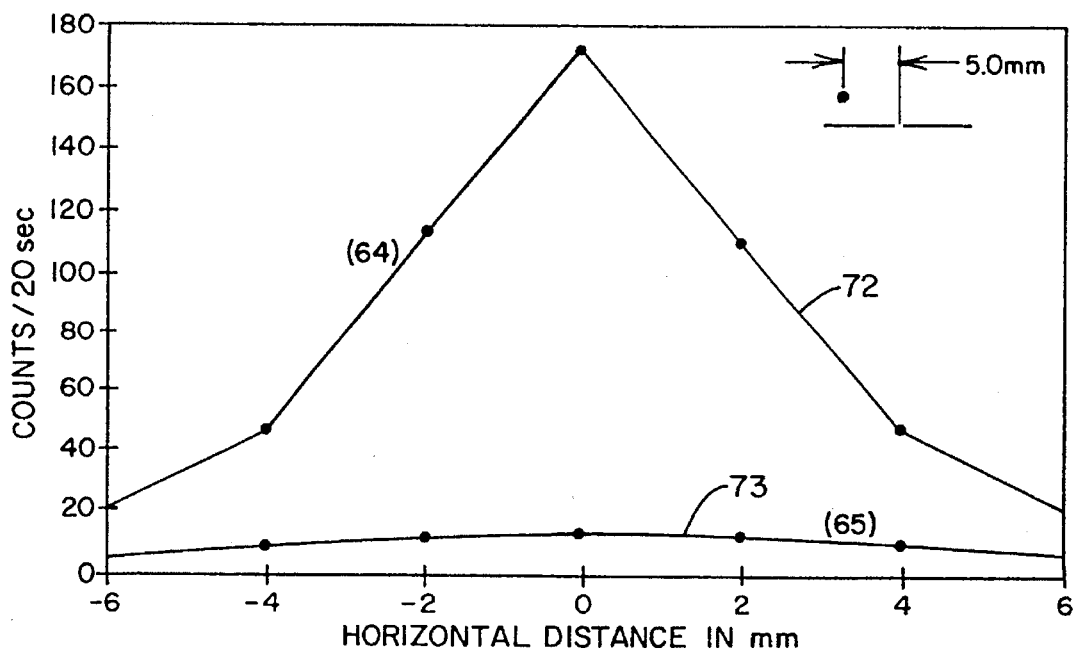
FIGS. 6A–6D show the computed outputs of two adjacent seven segment crystal arrays as may be employed with the invention, the figure showing different positions of a point source over one segment of one array.
Figure 6B:
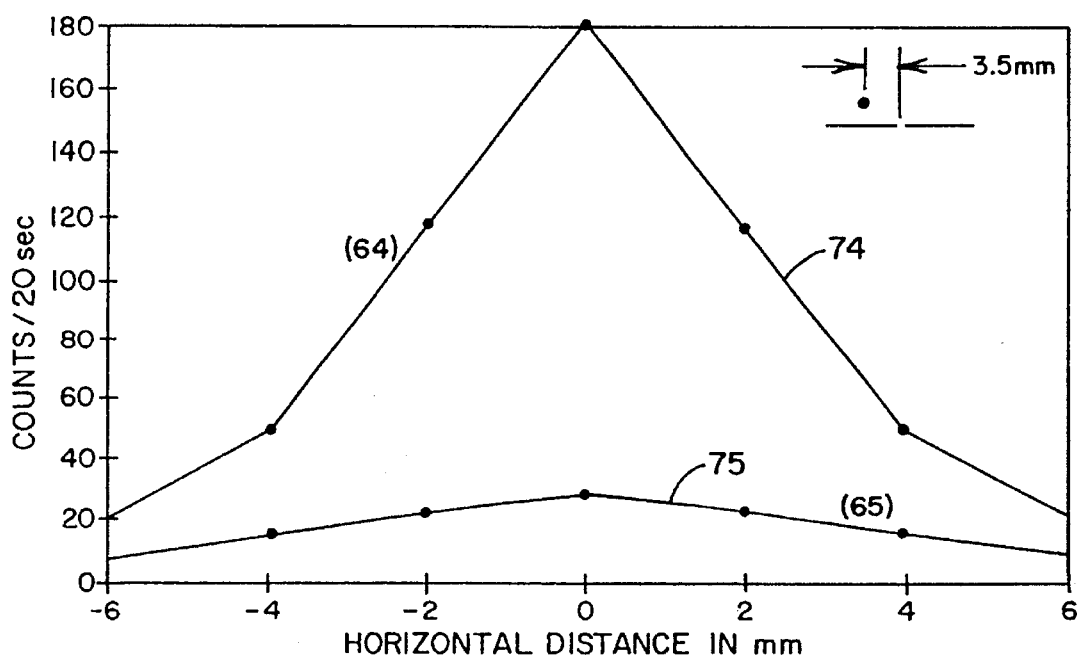
Figure 6C:
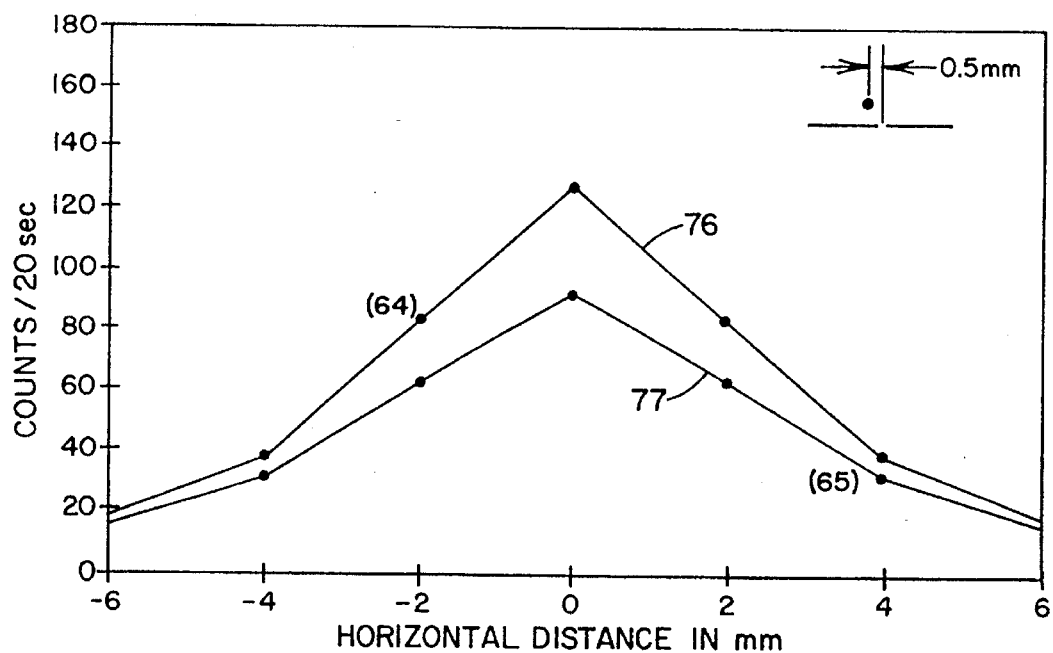

Referring to FIG. 6C, a plot corresponding to FIGS. 6A and 6B is provided for a condition wherein the point source is located ½ mm from the joinder line 66 over segment 4. Such positioning is represented at the small inset within the figure. As may be expected, the number of counts recognized at segment 4 has diminished as represented by curve 76 at horizontal distance 0. By contrast, the counts at segment 11 of array 65 have increased in count output to a value of about 92, as represented by curve 77 at the zero distance location. From those outputs, one can readily perceive that the point source is going to be over segment 4 but closely adjacent segment 11.

Figure 6D:
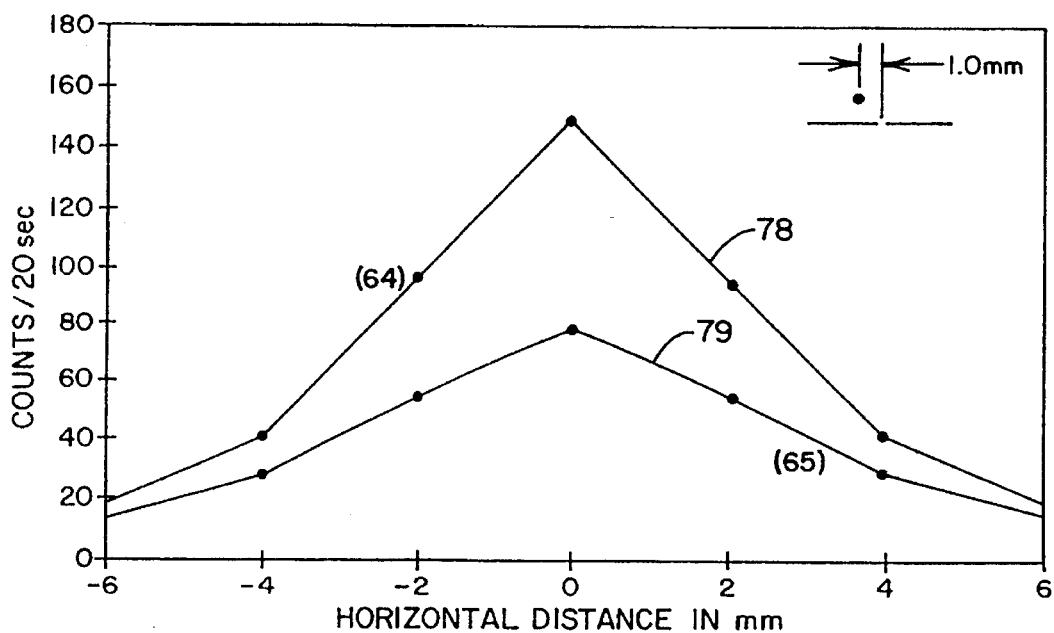

Referring to FIG. 6D, computed plots are provided for the positioning of the point source over segment 4 but located 1.0 mm from the joinder line 66. Such positioning is represented at the small inset within the figure. The curve of relative count distribution shown at 78 for array 64 indicates that, over segment 4, a count of about 145 is recognized corresponding with the 0 horizontal distance. This is an increase over the corresponding count described in connection with FIG. 6C, as may be expected. Correspondingly, the count evidenced at segment 11 is diminished to a value of about 75 counts as represented by relative distribution curve 79. Thus, the tumor pathologist is given good information as to the most likely location of a point source. Of course, the source of radiation emission in a tissue sample 26 will be greater than a mere point source in typical applications. This, in turn, evokes a larger "available target" for sectioning.

Figure 3A:
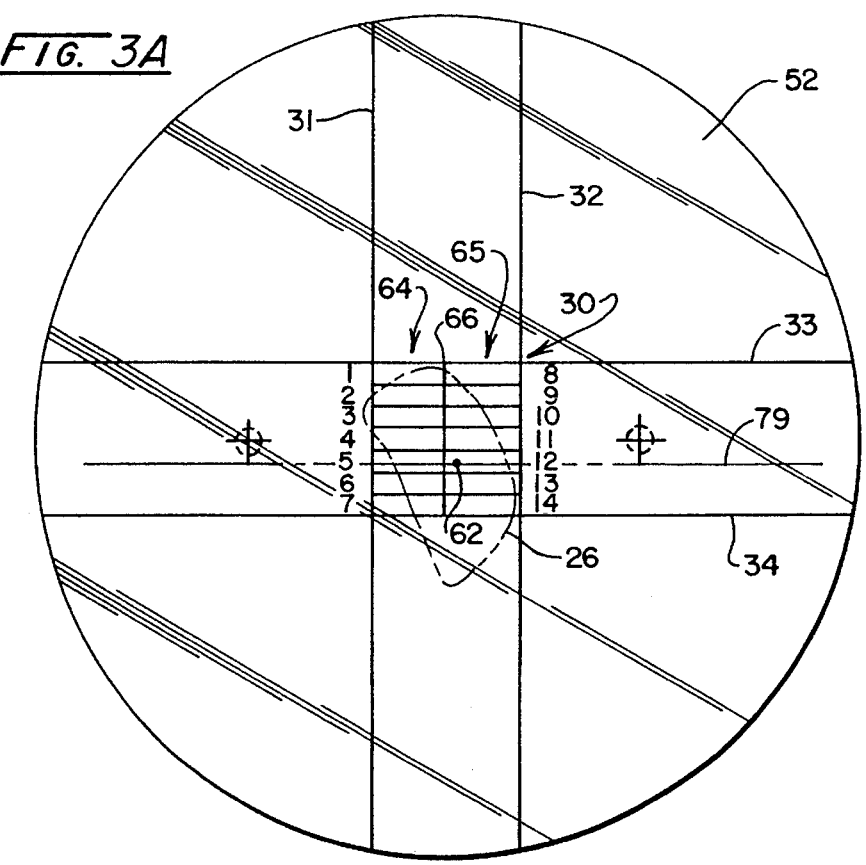
FIG. 3A is a top view of the apparatus of FIG. 1.
Figure 3B:
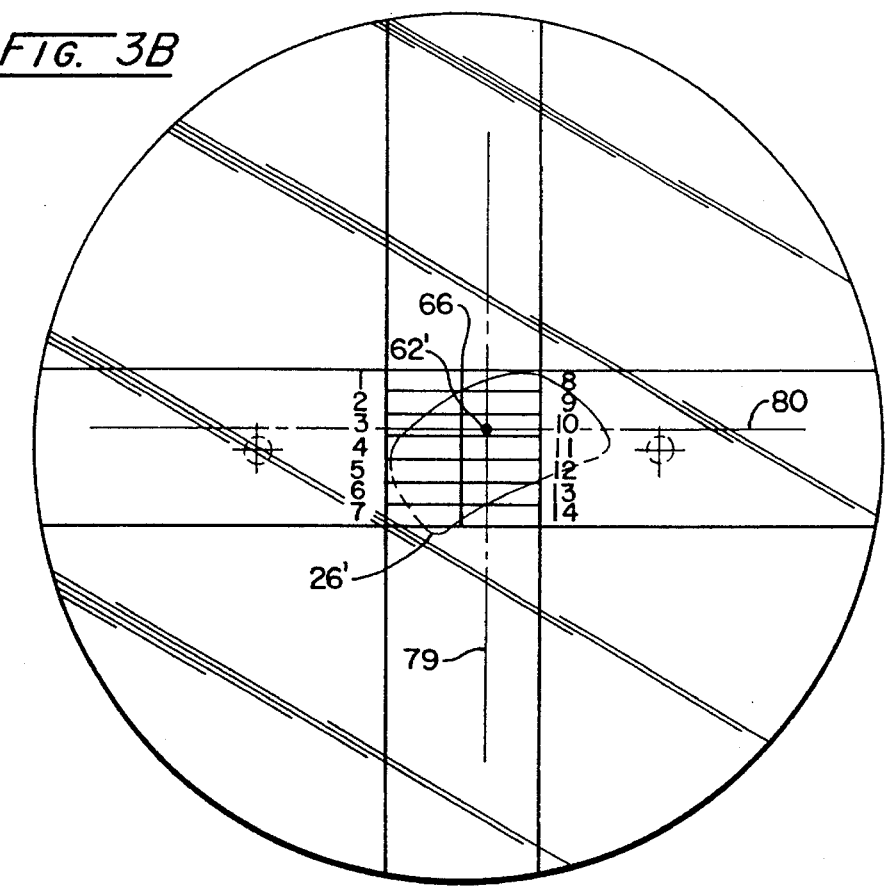
FIG. 3B is a top view of the apparatus of FIG. 1 showing a rotation of a tissue sample by an amount of 90°.
Figure 5B:
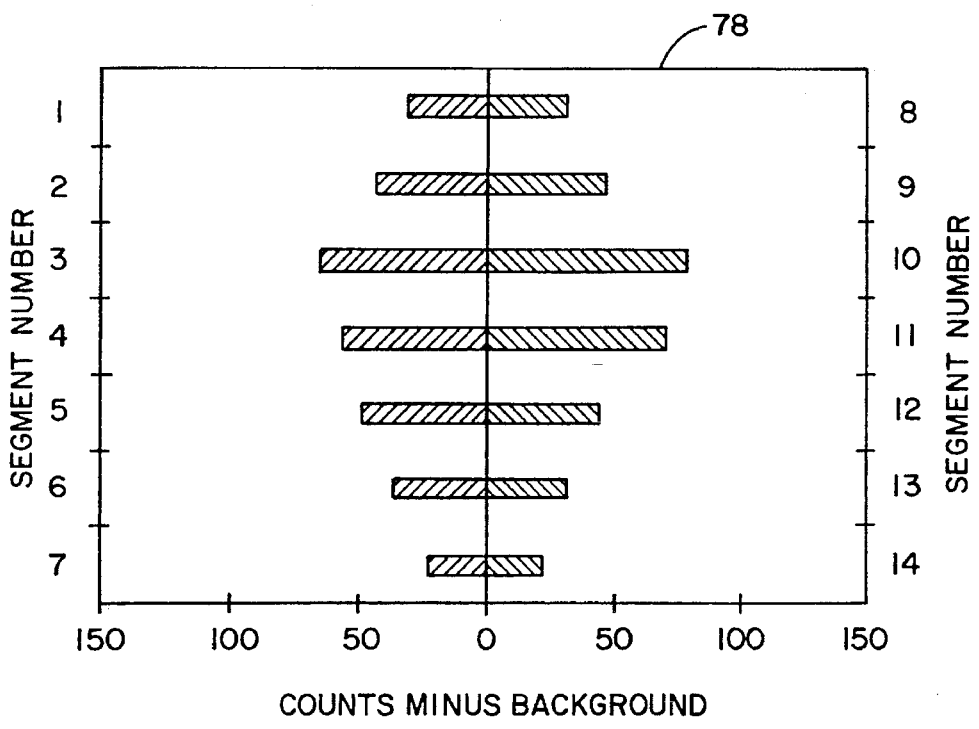
FIG. 5B is a representation of a monitor screen readout showing a sample rotation of 90° with respect to the readout shown in FIG. 5A.

While accurate information as to locator position within a tissue sample is provided with the singular orientation of sample 26 described in conjunction with FIG. 3A, as noted above, the system also permits a substantial enhancement of positional data by the simple expedient of turning the disposable sample support 52 by an amount of 90° and then causing another count evaluation to be undertaken. Such an arrangement is shown in connection with FIG. 3B which is located adjacent FIG. 18C. Referring to the former figure, it may be observed that sample 26 has been rotated counterclockwise 90° as represented by outline 26'. This causes the point source 62 to move to the location represented at 62'. For convenience, the reticulation and segment identification in FIG. 3B is retained from FIG. 3A, inasmuch as the crystal segment assemblage will not have moved but only sample 26. Point source 62' now is seen to be located over segment 10 in adjacency with segments 11, 3, and 4. By combining the data of FIGS. 5A and 5B either in the bar chart form shown or numerically, in effect, lines can be drawn through the locations of highest count as represented by line 79 in FIG. 3A and by line 80 in FIG. 3B. These lines 79 and 80 will intersect over the point source 62 as seen in the latter figure. As noted above, with this 90° reorientation of the sample 26, a refinement is achieved with the utilization of crystal segments which are relatively large, at least in their lengthwise dimension. This refinement is achieved without the investment otherwise required in many more channels of signal treatment and counting, and with a maintenance of the higher count rate available from larger crystal surface areas.

Returning to the constructional details of the apparatus 10, in a preferred embodiment, the form of crystal employed is cadmium zinc telluride, for example such crystals are marketed by Aurora Technologies, Inc., San Diego, Calif. Looking to FIG. 7, one crystal array incorporating seven components or segments is represented in general at 82. To provide the desired crystal assembly, two such arrays 82 are provided, each having seven crystal segments. The crystal array 82 is configured having a thin gold coating 84 formed continuously on its upwardly disposed side. During operation, that side is grounded. The opposite or lower side of the array 82 is formed having a similar gold coating which is divided into seven rectangular segments 86–92. Note, in this regard, the notch-like removal of gold coating between adjacent segments 86–92. With such an arrangement, each of the segments 86–92 acts independently, notwithstanding the fact that the crystal body 92 is continuous and its upward or forward photon receiving surface is coated continuously with a thin gold coating. For the present embodiment, each of the segments 86–92 is configured having the earlier-discussed 2 mm width and a 7 mm length. To provide the assembly at region 30, two such arrays as at 82 are positioned in adjacency to provide a square, 14 mm×14 mm segment assembly geometry. Now looking to FIG. 8, the crystal array 82 is seen positioned at crystal mount 46 within an electrically insulative cylindrical plastic insert represented generally at 96. Insert 96 is located within the cylindrically shaped cavity 98 or interior of brass cylinder 38. It is formed having an outwardly disposed flange region 100, tee upper surface of which nests against the inner surface of the corresponding outwardly disposed top portion 102 of cylinder 38. That outwardly disposed portion 102 extends inwardly to an upwardly disposed cylindrical component 104 to define a cylindrical opening through which the corresponding inwardly disposed cylindrical portion 106 of insert 96 is positioned. That portion 106 of insert 96 is formed having a cylindrical crystal receiving cavity 108 formed therein within which two of the crystal arrays are positioned. In the figure, crystal array 82 is seen positioned within cavity 108.

Figure 9:
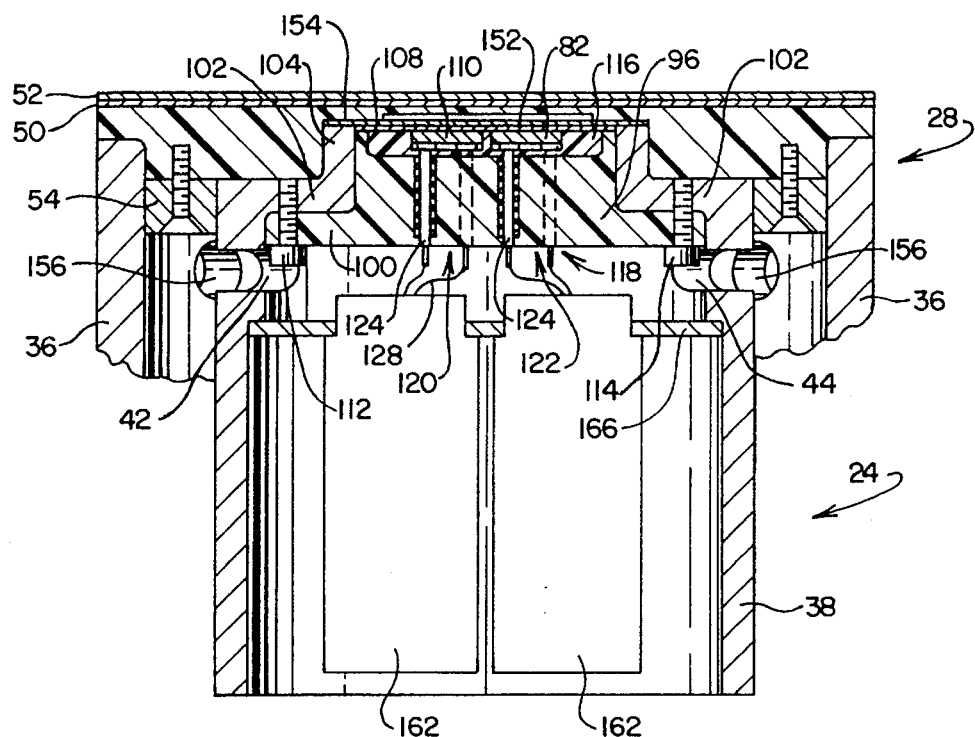
FIG. 9 is a sectional view taken through the plane 9—9 shown in FIG. 8.

Looking additionally to FIG. 9, a second crystal array 110 is shown within cavity 108 in adjacency with array 82. Array 110 is identically structured and is positioned in adjacency with array 82 to form the desired somewhat square geometric pattern. This adjacency is further revealed in FIG. 10. FIG. 9 further shows that insert 96 is retained in position by two alignment screws 112 and 114 which extend through flange region 100 and into top portion 102 of cylinder 38. Alignment screws 112 and 114 additionally are seen in FIG. 10.

Cadmium telluride crystals are preferred. CdTe crystals may be alloyed and still are referred to as "cadmium telluride" or "CdTe" crystals for present purposes. A preferred cadmium telluride crystal as described in commonly-assigned U.S. Pat. No. 5,441,050, issued Aug. 15, 1995 (and incorporated herein by reference), is CdTe material alloyed with zinc and generally represented by the expression: $Cd_{1-x}Zn_xTe$. In general, CdTe detecting crystals exhibit benefits such as operability at room temperature, high counting rates and small size. The preferred $Cd_{1-x}Zn_xTe$ detector crystals for use in the present invention exhibit very high stability with respect to noise generation when subjected to variations in temperature. Thus, these crystals are ideally suited for surgical procedures where calibration will occur at operating theater temperatures, i.e. about 15° C. and the probe devices will absorb the heat emanating from the body cavity of the patient undergoing surgery, a temperature excursion amounting, for example, to about 15° C. or 20° C. The proportioning of the Cd component and Zn component of the crystals may vary to provide an effective ratio selected to suit the particular requirements of the user. However, a lower limit or boundary for the proportion of zinc wherein x equals about 0.2 has been determined, while a correspondingly high boundary or limit wherein x equals 0.8 has been determined. The alloyed crystals are marketed by Aurora Technologies Corporation, San Diego, Calif., 92067. Additional information concerning the alloyed crystals is provided in the following publications.

Butler, Lingren and Doty, "$Cd_{1-x}Zn_xTe$ Gamma Ray Detectors", IEEE Transactions on Nuclear Science, Santa Fe, N. Mex., 1991.

Butler, Doty, and Lingren, "Recent Developments in CdZnTe Gamma Ray Detector Technology", Proceedings of the International Symposium of the SPIE, Santa Fe, N. Mex., July, 1992.

Doty, Butler, Schetziaa and Bowers, "Properties of Cadmium Zinc Telluride Grown by a High Pressure Bridgman Method", *J. Vac. Sci. Technol.*, Vol. B10, June/July, 1992.

Because cadmium telluride forms of crystals exhibit microphonic (piezoelectric) effects, and are very fragile, their mounting for the instant use requires avoidance of noise generating contacts. In this regard, referring to FIGS. 8 and 9, the crystal receiving cavity 108 is provided with an in situ molded electrically insulative polymeric insert 116. Preferably, the insert 116 is formed of silicone, generally referred to as silicone rubber which is an elastomer in which the C linkages of a polymerized hydrocarbon are replaced by Si-O linkages. It is sold, for example, under the trademark "SILASTIC". The insert 110 is formed, for example, by utilizing a "dummy" mold essentially having the dimension of the crystal arrays 84 and 110 in combination with a mold release. With this approach, receptacles for receiving the arrays 82 and 110 readily are formed. To provide electrical bias and signal communication with each of the segments for the arrays 82 and 110, a pattern of cylindrical openings or bores is provided within cylindrical portion 106 of insert 96. Certain of these bores or passageways are shown in dashed line fashion at 118 in FIG. 8 and in sectional fashion as well as dashed fashion by the same numeric designation in FIG. 9. The pattern of these passageways or bores 118 is revealed in FIG. 10. In that figure, one grouping of seven such passageways is revealed in general at 120 providing communication with the segmented side of crystal array 110, while a corresponding pattern of such passageways is represented in general at 122 providing for communication with crystal segment array 82. Each of the passageways or bores within the array 118 contains upwardly biased contact pins, two of which are seen in FIG. 9 at 124.

Referring to FIG. 11, the structuring of the passageways and associated contact pins 124 is revealed in enhanced detail. In the figure, pin 124 is seen to have an elongate cylindrical configuration, the lower end of which is formed with a bore 126 within which a lead 128 is inserted and attached by soldering. Pin 124 is slidably movable within a cylindrical bore or passageway 130 of the array 120. The upper contact tip 132 of the pin 124 is of expanded diameter such that it defines a lower flange region which abuts against an alignment collar 134 positioned within passageway 130. A helical spring 136 is shown having one end abutting a shoulder 138 formed within passageway 130, the opposite side thereof abutting against the slidable collar 134. This serves to bias the tip 132 against a segment defining coating of gold 138 associated with crystal array 110. Segment 138, for example, corresponds with either segment regions 86 or 92 of array 82 as described in conjunction with FIG. 6. A next adjacent segment is shown, for example, at 139. To provide a non-rubbing, positive contact between pin 124, tip 132, and the gold segment component 138, a polymeric, silver particle containing electrically conductive material 142 is positioned intermediate the tip 132 and gold coating segment 138. A similar coating of this material is shown at 144 in connection with gold segment 132 and an adjacent contact pin tip 146 of pin 148. Materials 142 and 144 may be provided, for example, as a conductive system marketed by Tecknit Inc. of Cranford, N.J.

Figure 8:
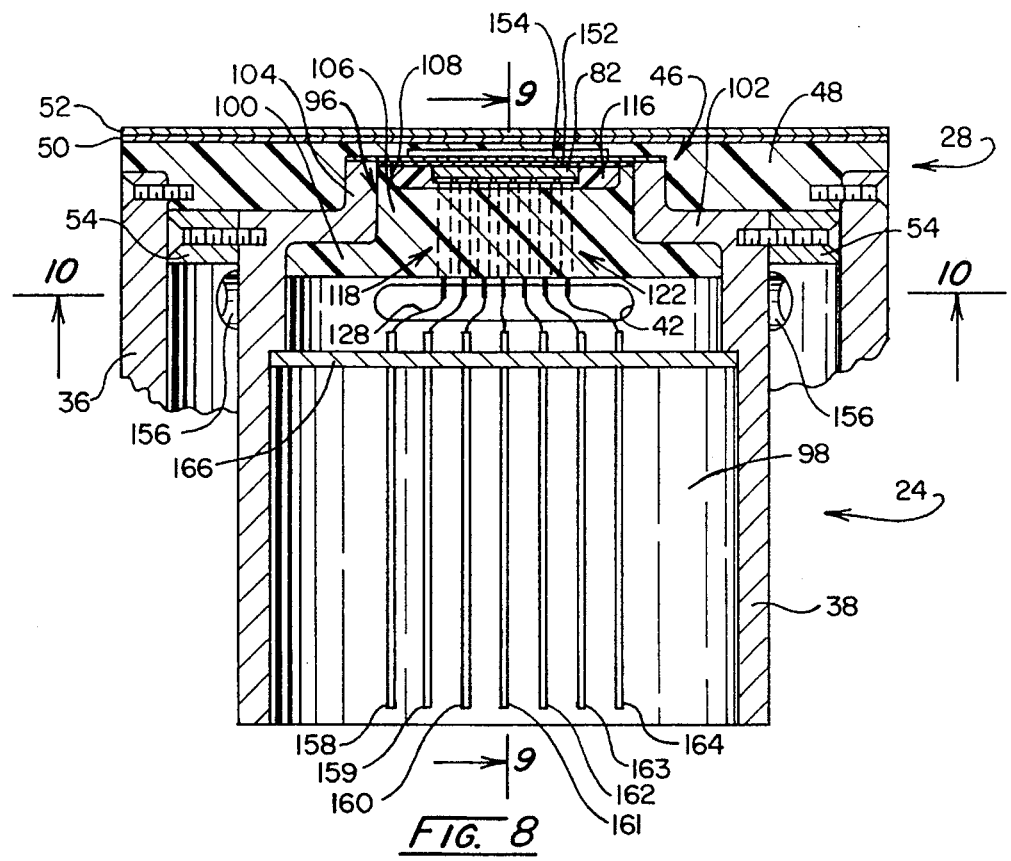
FIG. 8 is a sectional view taken through the plane 8—8 shown in FIG. 2.

Now looking to the upwardly disposed side of the crystal arrays and, in particular, array 110 as seen in FIG. 11, the continuous gold coating at that upper surface is shown at 150. Cover this continuous coating 150 there is positioned an electrically conductive cushion layer 152 which is coextensive with the periphery of crystal receiving cavity 10G. Preferably, this electrically conductive layer 152 is provided as a non-woven TEFLON cloth which is carbon filled to the extent rendering it an effective conductor of electricity. In general, the material is a carbon containing stretched, highly crystalline, unsintered polytetrafluoroethylene marketed under the trademark "GORETEX" Cashion layer 152 is retained in position against the bias asserted from the contact pins as at 124 by a gold plated aluminum disk 154 which, as seen in FIGS. 8 and 9, extends over the upwardly disposed cylindrical component 104 of the top portion of brass cylinder 38. Disk 154 is soldered to upwardly disposed cylindrical component 1(24 which, additionally, represents system ground. Accordingly, the necessary ground which is to be asserted at the upward face of crystal 110 is applied from the disk 154 and through the electrically conductive cushion layer 152 to the upwardly disposed gold plated surface of crystals 82 and 110. FIGS. 8 and 9 further show the presence of air circulation holes 156 in the upper region of outer cylinder 36. Additionally, the leads as at 128 extending from the contact pins are directed to the inputs of preamplification stages mounted within cylinder 38. In this regard, these preamplification stages are mounted upon paired circuit boards 158–164 which are, in turn, suspended from a supporting disk 166. Fourteen such preamplifier circuits are provided, one for each of the discrete 14 segments of the crystal assemblies. The outputs from these paired circuit boards 158–164 have been earlier described as being provided through cable array 56 (FIG. 2). Preamplification circuits as may be employed with the instant device are described, for example, in U.S. Pat. No. 4,801,803 by Denen, et al., entitled "Detector and Localizer for Low Energy Radiation Emissions", issued Jan. 31, 1989, and incorporated herein by reference. Additionally, a preferred preamplification stage is described in application for U.S. Pat. No. 5,441,050, entitled "Radiation Responsive Surgical Instrument" by Thurston, et al., issued Aug. 15, 1995, and assigned in common herewith.

Figure 12:
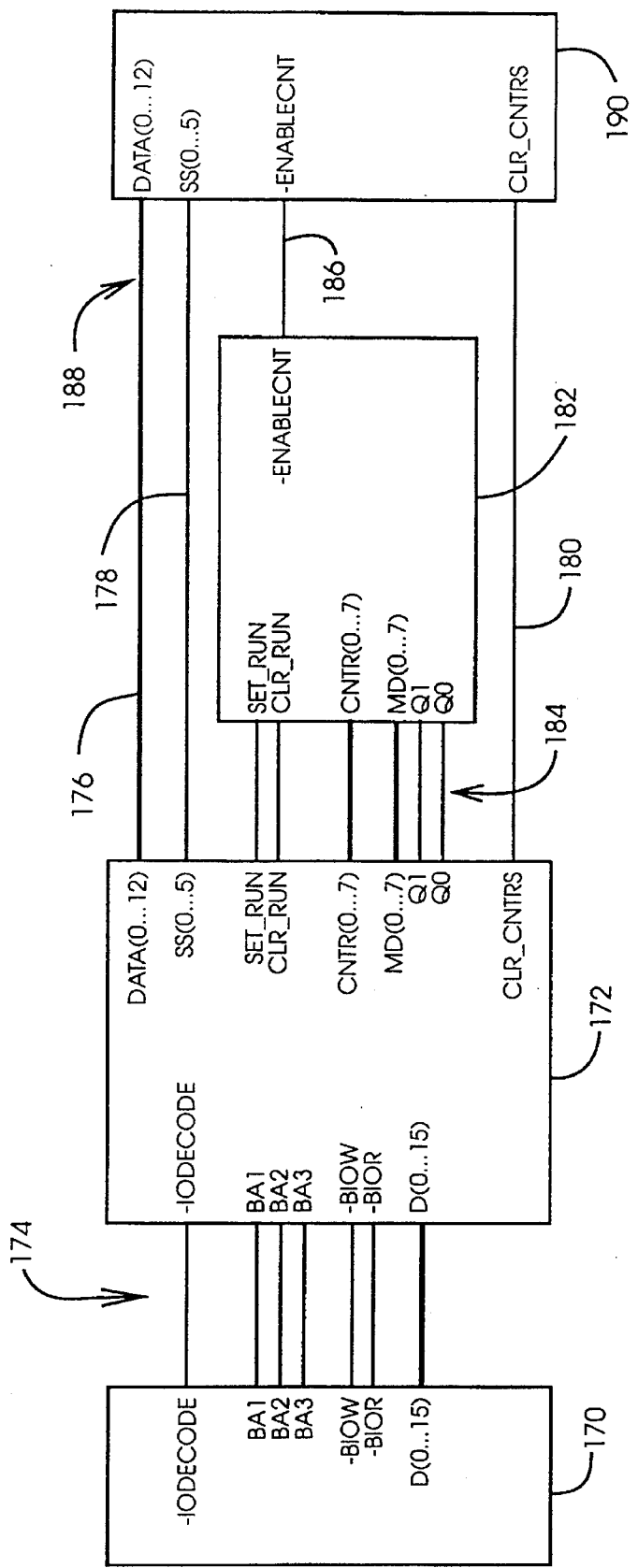
FIG. 12 is a generalized block diagram of circuitry employed with the apparatus of the invention.

Referring to FIG. 12, a highly generalized block diagram is presented describing the interaction of circuitry mounted within apparatus 10 and an interface board intended for deployment with a personal computer. This interface board includes three functions, an initial one being represented at block 170. The interface function at block 170 is one somewhat generic in nature, including edge connectors for coupling with a PC mother board, bus signal buffers, decoders for providing board response to the computer system, and the like. The circuitry at function 170 communicates with a more specific component of the, interface board represented at block 172, such communication being represented by the line array represented generally at 174. Circuitry as is represented at block 172 carries out decoding of each of the 14 channels of the system including the individual binary counter assigned for each channel. Decoding commands for this function will include the selection of given segments, the reading of segments, the writing of control information, the clearing of select counters assigned to each channel, and a diagnostic function. This results in the association of the circuit function 172 with, a data bus 176 (DATA0 . . . 12), a selection bus 178 (SS (0 . . . 5)), and a clear command line 180 (CLR CNTRS). A next circuit function for the interface board is represented at block 182 and its association with block 172 is represented at line array 184. The timing function of block 182 contains circuitry serving to establish the duration for which counting of photon generated pulses will be carried out. Selection of a timing interval, for example 20 seconds or the like, needs to be programmable by the user through a PC. Circuit 182 serves to provide a count enable signal (—ENABLE CNT) as represented at line 186.

The outputs represented at buses 176 and 78 as well as lines 180 and 186 are combined in a ribbon cable re;presented generally at 188 which extends to the apparatus 10 and the circuitry therein, now represented at block 190. Block 190 is representative of the circuitry described in conjunction with circuit boards 58–61 illustrated in FIG. 2. This circuitry establishes a channel for each of the 14 segments of the crystal assembly, carries out signal treatment of the preamplified inputs and performs counting within each channel.

Figure 13:
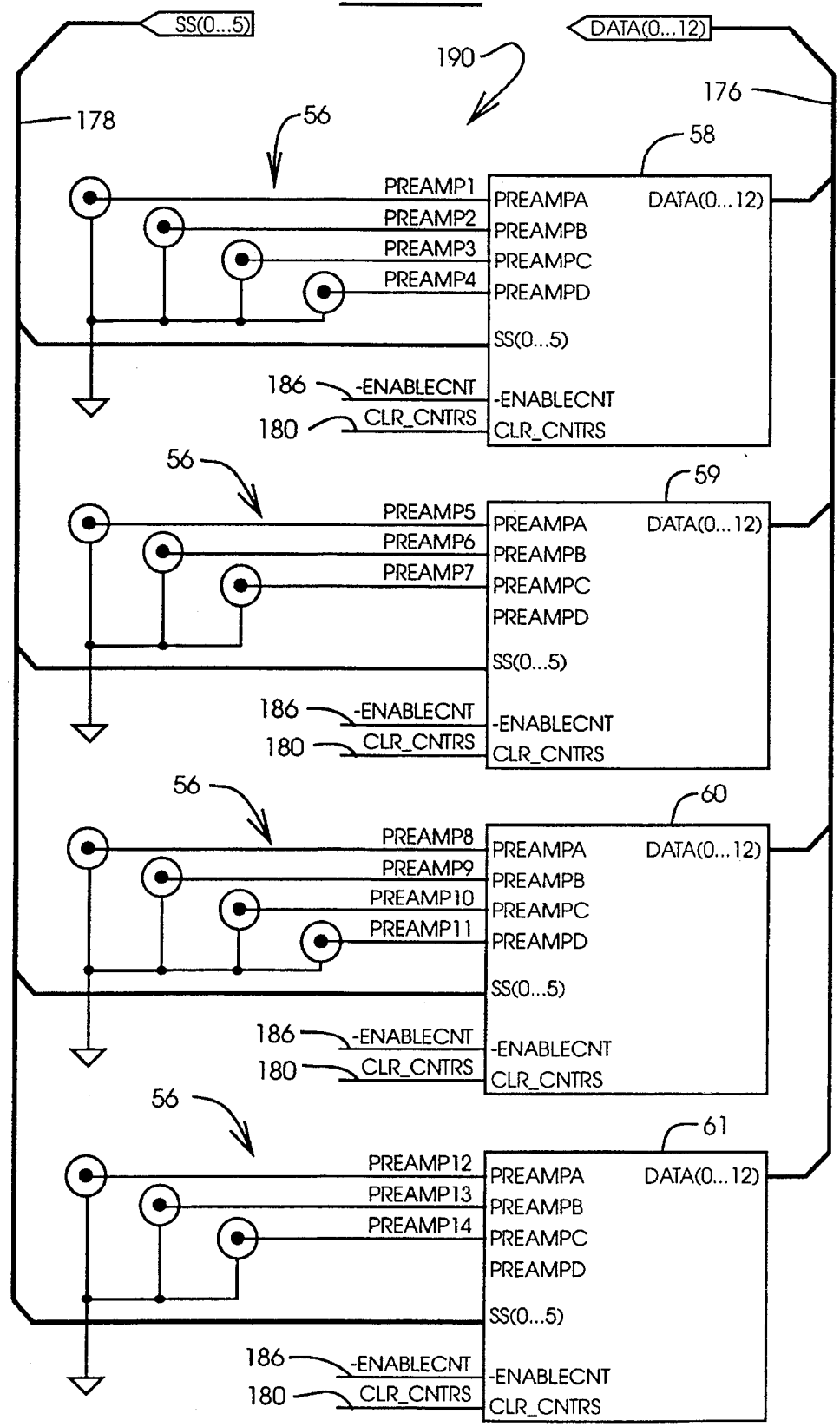
FIG. 13 is a block diagram of a multiple channel circuit assemblage shown in block form in FIG. 12.

Referring to FIG. 13, the circuitry represented by block 190 is expanded to a higher level of block detail. In this regard, the earlier-noted circuit boards 58–61 are identified as blocks, each of which incorporates a possible four channels identified as PREAMP-A-PREAMP-D. These inputs for each of the blocks 58–62 are seen coupled with preamplifier outputs again represented by the array designation 56. Further, bus inputs 176 and 178 are provided to the essentially identical circuits 58–62 as well as the control signals from lines 180 and 186.

Figure 14A:
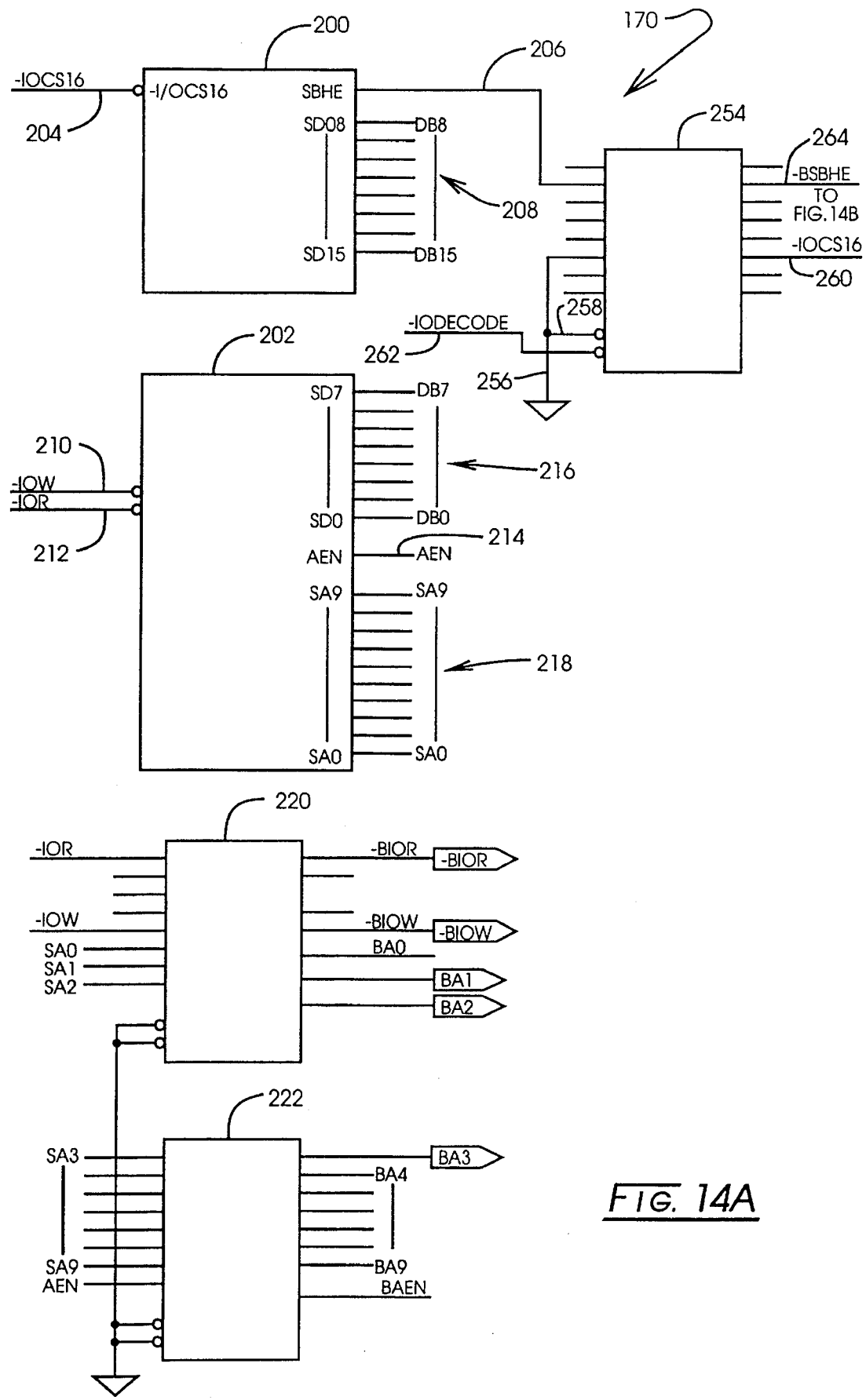

Referring to FIGS. 14A and 14B, the interface circuitry associated with block 170 as described in connection with FIG. 12 is revealed at an enhanced level of detail. In FIG. 14A, edge connectors intended for coupling with the mother board of a PC are represented at blocks 200 and 202. The outputs of interest for block 200 are at line 204 carrying the signal —IOC S16, a coupling to the SBHE terminal at line 206, and the data output array DB8–DB15 represented in general at 208. Correspondingly, the outputs of interest at connector 202 are at line 210 carrying the —IOW signal; line 212, carrying the —IOR signal; line 214 carrying an AEN enable signal; the output array represented generally at 216 carrying lines, DB7–DB0; and array 218 providing outputs SA0–SA9. Arrays 208 and 216 combine to provide a 16-bit software operation.

The address outputs of array 218, the read and write commands at respective lines 210 and 212, and the enable signals at line 214 are buffered by non-inverting buffers 220 and 222. Provided, for example, as type 74ALS244, buffers 220 and 222 are seen to provide the same outputs but in buffered fashion as labeled BA0–BA9, —BLOW, —BIOR, and BAEN. This latter signal along with the signals BA7 and BA9 serve to enable a three line to eight line decoder 224 seen in FIG. 14B, the output of which is selected by the data supplied thereto from buffered lines BA5, BA6, and BA8. Referring to FIG. 14B, the singular output of decoder 224 at line 226 carries the signal —IODECODE which, as represented at line 228, is distributed elsewhere in the circuit. Line 226 additionally is directed to the G input of another decoder 230, the A input to which is logic low and labeled BA0 and the B input thereto is coupled to logic low deriving ground. The result is the submittal of a select code (300 hex) to an OR function represented at 232 which provides a SELECT signal at line 234. This signal provides a selection of the PC operation with apparatus 10 as line 234 becomes active. Decoder 224 may be provided, for example, as a type 74S138, while decoder 230 may be provided, for example, as a type 74S139.

Additionally provided with the instant circuit are two bus transceivers 236 and 238, the A terminal sides of which are coupled with data arrays 208 and 216 as labeled, and the B terminal sides of which receive or transmit respectively array lines D0–D7 and D8–D15, forming part of the array 174 described in connection with FIG. 12. Transceiver 236 as are enabled in the presence of either a buffered read (—BIOR) or a buffered write (—BIOW) is present at respective lines 240 and 242 as directed to the inputs of an OR function 244. The output of OR function 244 at line 246 is directed to one input of an AND function 248 at line 252. The latter signal is derived as the signal at line 234. Transceiver 238 is enabled at the same time as device 236 but following a more diverse logic loop. In this regard looking additionally to FIG. 14A, a buffer 254 is provided, the input to which from line 206 is enabled from a ground provided from lines 256 and 258. On the other hand, the input thereto from line 204 as represented at line 260 is enabled with the application of earlier-noted —IODECODE from line 228 as represented at line 262. The resultant output at line 264 is applied to the B input of a decoder 266. Device 254 may be provided, for example, as a type 74ALS244, while device 266 may be provided, for example, as a type 74S139. The G input to device 266 also receives the —IODECODE signal from line 228 as represented at line 268 and the resultant singular output at line 270 is permitted through both inputs to OR function 272 and line 274 to one input of AND function 276. The opposite input to AND function 276 receives the signal at line 246 from line 278, and its output at line 280 is directed to the enable input terminal of transceiver 238. Both transceivers 238 and 236 also receive the —BIOR signal from device 220 (FIG. 14A) and may be present, for example, as type 74LS245.

Figure 15A:
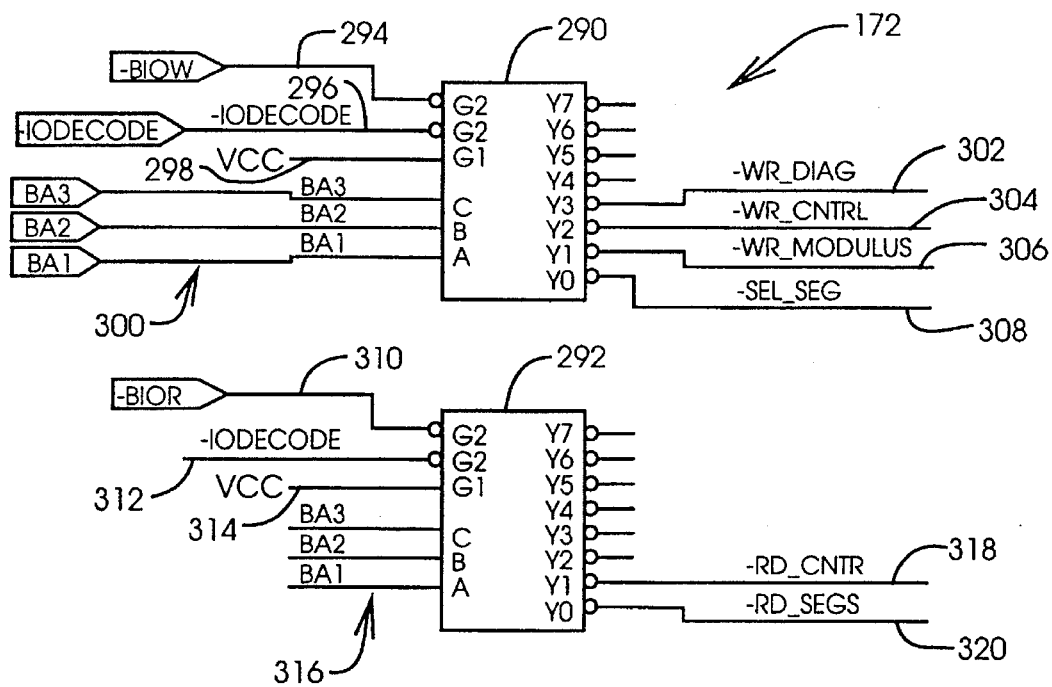
FIGS. 15A–15C, when combined, are an electrical schematic diagram of an interface circuit shown in block form in FIG. 12.
Figure 15B:
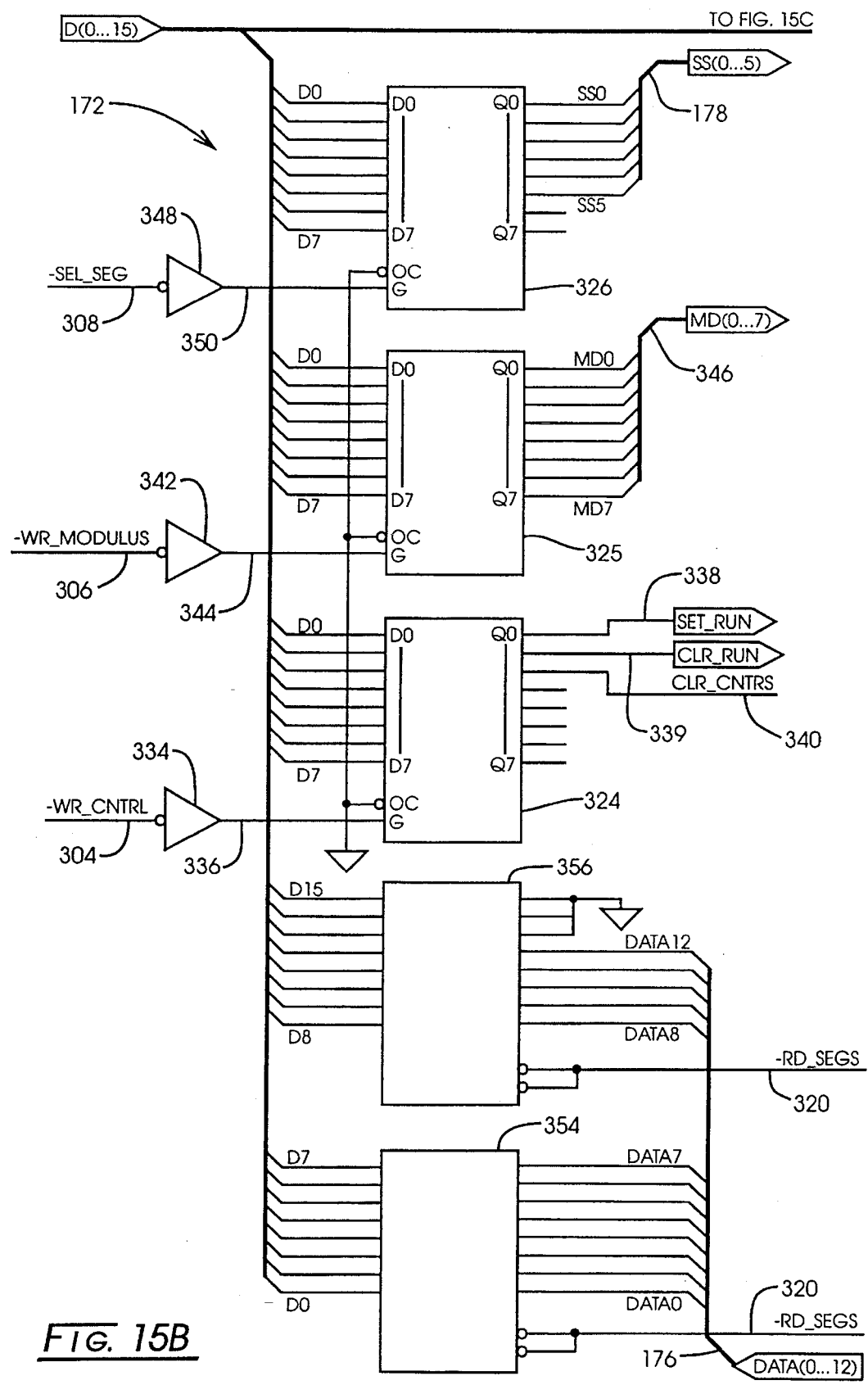
Figure 15C:
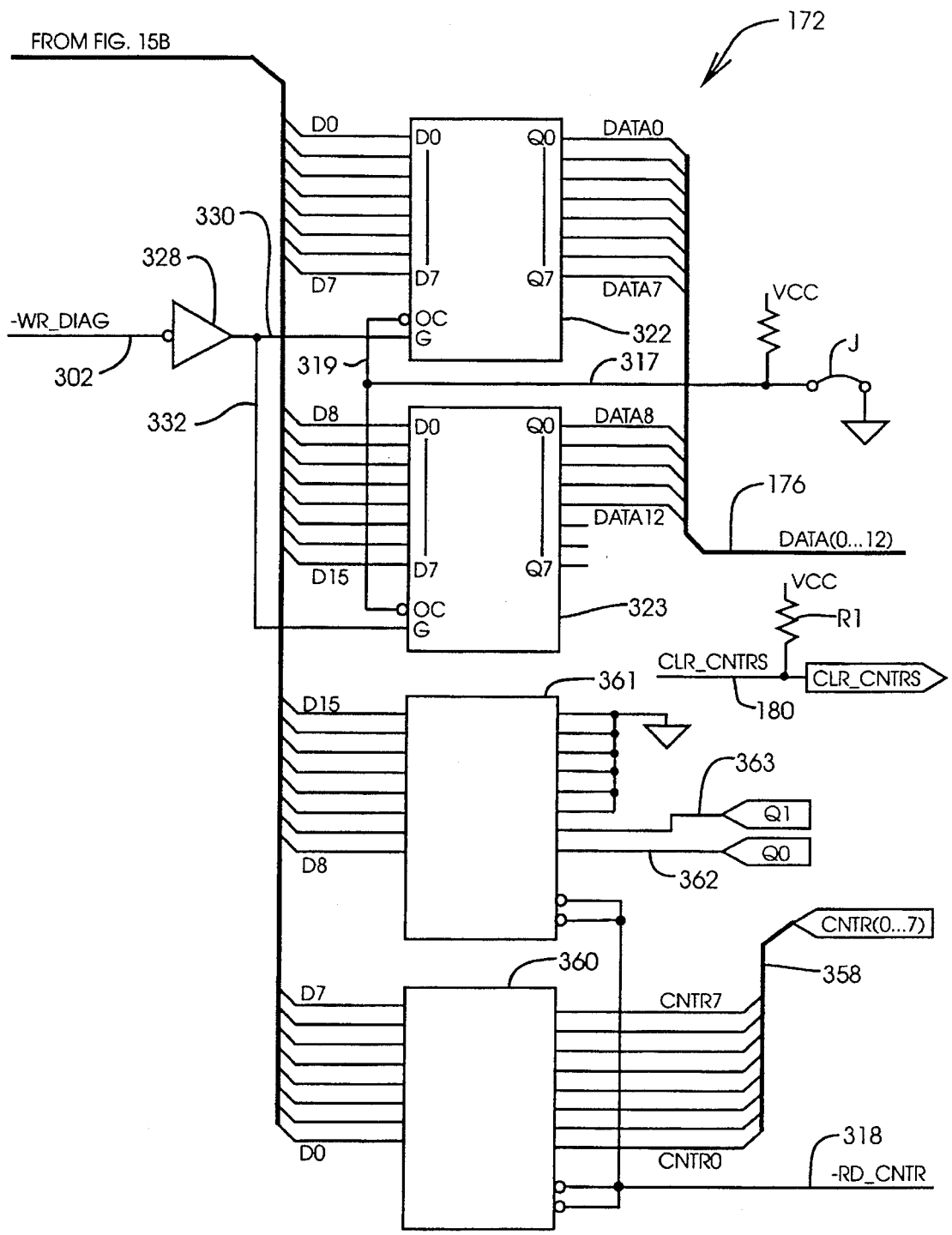

As noted in connection with FIG. 12, interface circuitry 170 is associated via lead and bus array 174 with an interface circuit represented at block 172. Turning to FIGS. 15A–15C, a more detailed representation of the circuitry at block 172 is revealed. Circuitry 172 carries out decoding, buffering, and provides output registers. Looking to FIG. 15A, decoding is carried out by decoders 290 and 292 which may be provided, for example, as type 74S138. Decoder 290 responds to enabling inputs at its G terminals as provided from the buffer write signal (—BLOW) as developed from device 220 (FIG. 14A) and seen at line 294, the —IODECODE developed from line 228 and seen at line 296 and VCC at line 298. Selection addressing is provided from the three line input at three line array 300 carrying BA1–BA3 signals. Signals from decoded 290 include a write diagnostic selection (—WR_DIAG) at line 302; a write control (—WR_CNTRL) at line 304; a write modulus signal (—WR_MODULUS) at line 306 which provides for the presetting of a value into a timer-counter; and a segment select signal (—SEL_SEG) at line 308.

Decoder 292 is enabled with the —BIOR signal from device 220 of FIG. 14A as represented at line 310; the —IODECODE signal from line 228 (FIG. 14B) as represented at line 312; and VCC as shown at line 314. The device is addressed from outputs BA1–BA3 in the same manner as device 290 and as represented at three-line array 316. Array 316 provides for the development of a counter timer reading (—RD_CNTR) as represented at line 318 and a segment read command (—RD_SEGS) at line 320 providing for a reading of channel outputs. Looking additionally to FIG. 15C and then FIG. 15B, the outputs of decoder 290 are directed to the gate inputs of five eight-bit latches 322–326. Data inputs to these latches are coupled with a 16-bit databus described in connection with FIG. 12 at array 174. In this regard, the diagnostics command at line 302 is submitted through buffer inverter 328 and lines 330 and 332 to the gate enable inputs of latches 322 and 323. This provides for the presentation of signals DATA0–DATA12 at bus 176 as earlier described in connection with FIG. 12 and which is directed to apparatus 10 circuitry represented at block 190. Note that the outputs from these latches is applied to the Bus Data (0 . . 12) only provided the jumper, J, shown in FIG. 15C is inserted, thereby enabling the tri-state outputs of latches 322 and 323 from lines 317 and 319. When this jumper, J, is removed (the normal mode) these latches (322 and 323) are effectively non-functional. This diagnostic capability is used to test and debug the computer interface board and software prior to the completion of the logic in block 190 of FIG. 12. Specifically, data written to latches 322 and 323 is available to be read by 356 and 354, the gamma (photon) counter reading channel. Looking to FIG. 15B, the write control signal at line 304 is directed through inverter buffer 334 and line 336 to the gate input of latch 324. This provides for the latch development of a SET_RUN signal at line 338, a CLEAR_RUN signal at line 339, and a CLEAR COUNTERS signal at line 340. The write modulus command (—WR_MODULUS) at line; 306 is directed through inverter buffer 342 and line 344 to the gate input of latch 325 which provides for the development of signals MD0–MD7 at eight lead bus 346 which also is present within the array 184 described in connection with FIG. 12. Finally, the segment select command (—SEL_SEG) at line 308 is directed through inverter buffer 348 and line 350 to the gate of latch 326. Latch 326 develops the segment select signals SS0–SS5 which are presented along earlier-described bus 178. Devices 322–326 may be provided, for example, as type 74LS373.

Data from the circuitry 190 of apparatus 10 at bus 176 (DATA0 . . . 12) is directed to the inputs of two non-inverting buffers 354 and 356. This information, representing the output of binary counters is transferred to the data bus of array 174 upon the occurrence of the read segments command developed from line 320. Devices 354 and 556 are tristatable and may be provided, for example, as a type 74LS244.

Counter timer data is derived from the timer circuitry 182 and bus 358 of array 4. Looking to FIG. 15C, bus 358 is directed to the input of another non-inverting buffer 360 which is activated upon the assertion of a read timer counter command at line 318. That same command is directed through a non-inverting buffer 361, the input to which is coupled to receive a Q0 signal at line 362 and a Q1 signal at line 363. Lines 362 and 363 are within array 184 from the timer circuit 182 and form part of a controller function output described in connection with FIG. 16A–16C. Finally, a counter clearing signal (CLR_CNTRS) is developed from VCC and resistor R1 at line 180 which is directed to the circuit function 190 of apparatus 10.

Figure 16C:
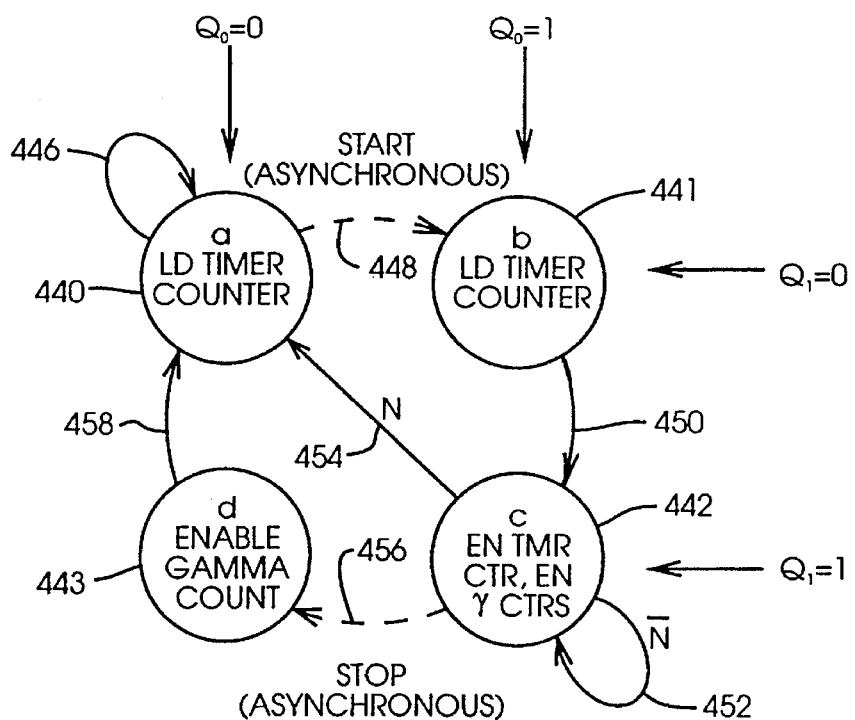
FIG. 16C is a state diagram describing the operation of the circuit of FIG. 16A.
Figure 16A:
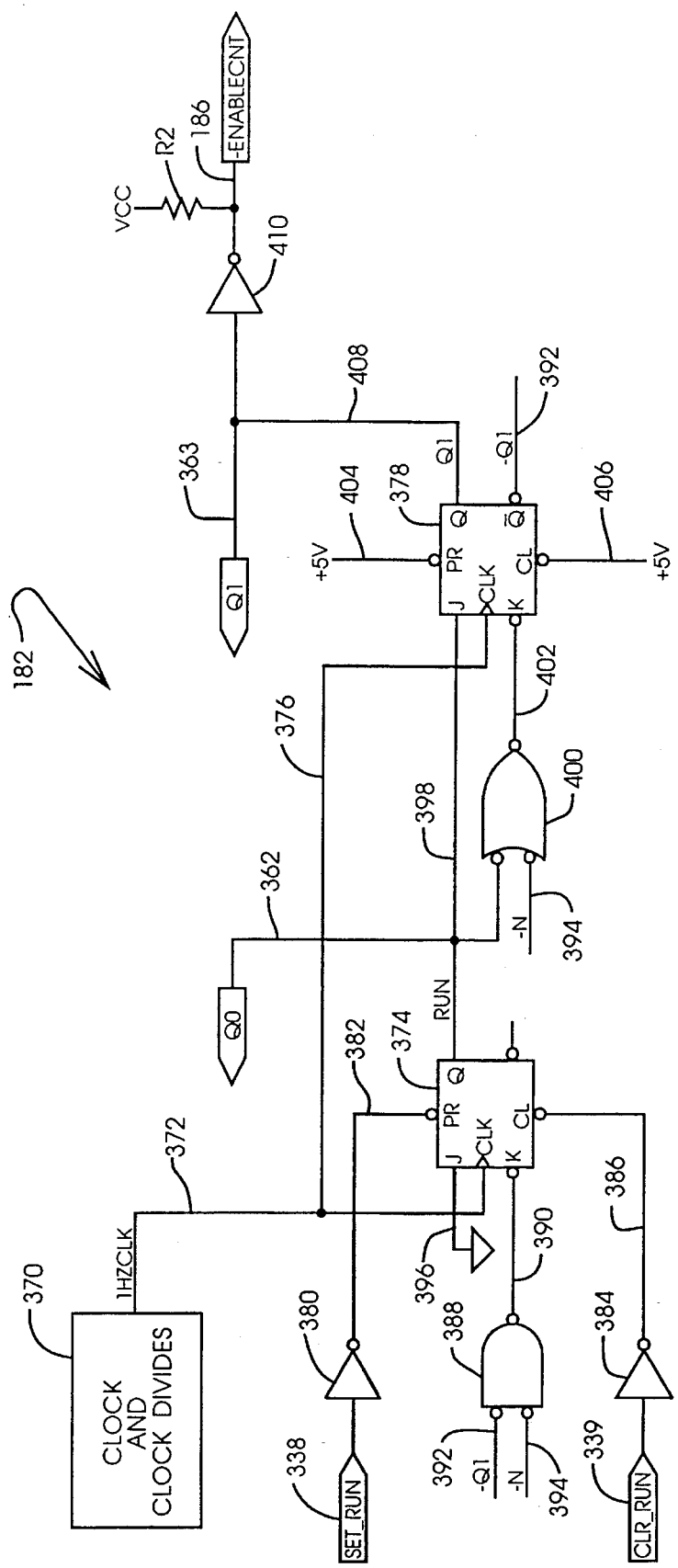
FIG. 16A is an electrical schematic diagram showing a controller circuit employed with the invention.
Figure 16B:
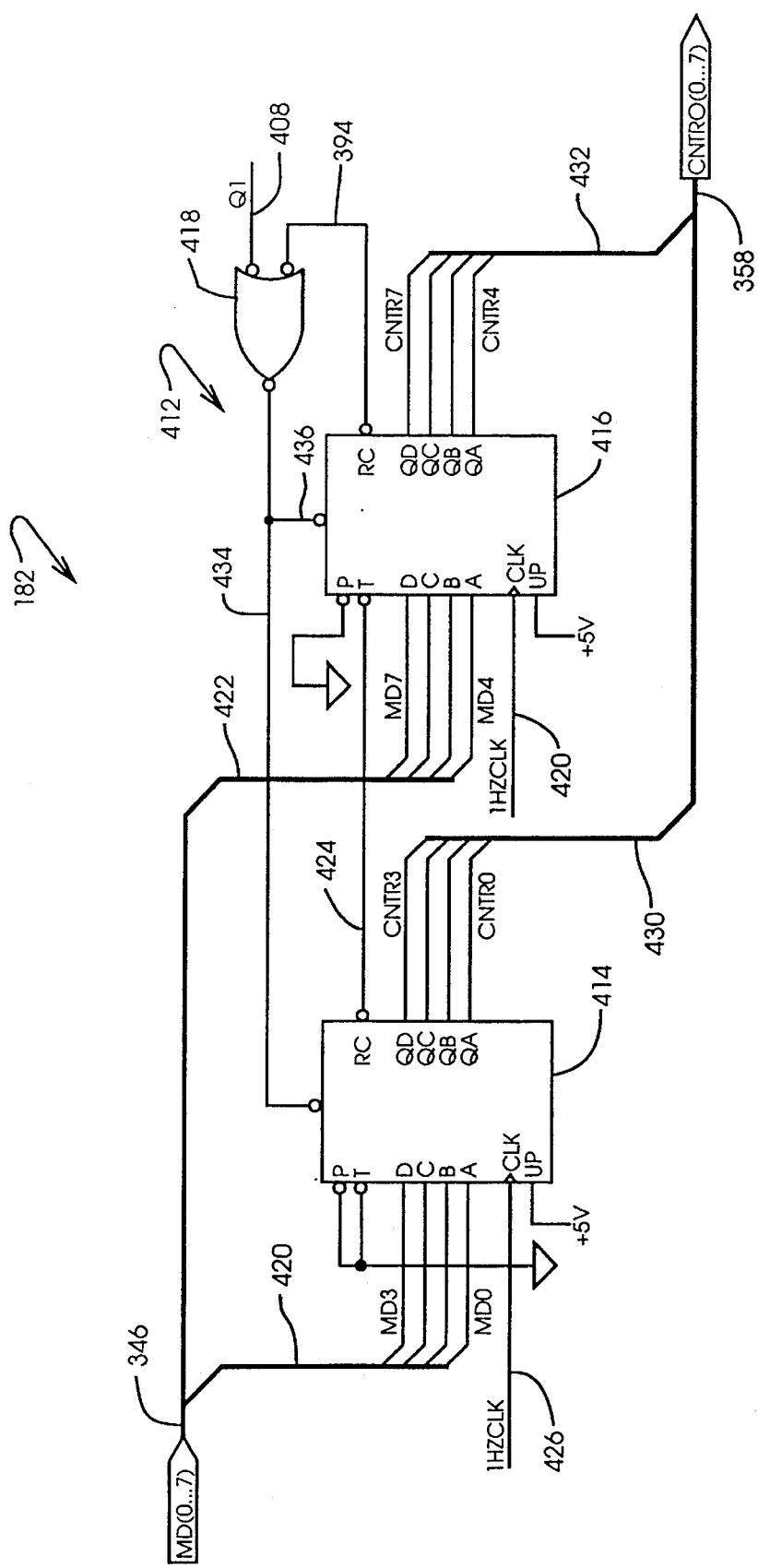
FIG. 16B is an electrical schematic diagram showing a timer/counter circuit employed with the invention.

Referring to FIGS. 16A–16C, the controller and timer-counter functions discussed in general in connection with block 182 in FIG. 12 are revealed at an enhanced level of detail. Locking to FIG. 16A, the clock-controller components of the circuit 182 are revealed. In general, the clock input to this circuit is at 1 Hz as represented at block 370 and line 372. The 1 Hz output at line 372 may be developed in conventional fashion, for example, employing a 2 MHz clock in combination with a counter, for example a type 74 HC 4040 to provide a division by 128. This divided output then may be submitted to a cascaded grouping of four counters, for example of type 74 LS 169 to provide a subsequent division by 15,625. The 1 Hz clock signal at line 372 is directed to the clock input of a JK flip-flop 374 and as represented at line 376 to the corresponding clock input of a JK flip-flop 378. Devices 374 and 378 may be provided, for example, as type 74 LS 109. Flip-flops 374 and 378 are capable of assuming four states which are employed to control a timer-counter which counts the amount of time elapsed for a given collection period of validated photon emissions. This timer/counter function performs, then, in conjunction with binary counters of the system which count validated gamma emissions which are provided as segment specific pulse outputs during the counter/timer intervals. To develop the above states, a set/run signal (SET-RUN) from line: 338 is introduced through buffer inverter 380 and line 382, while a clear (CLR-RUN) run input from line 339 extends to buffer/inverter 384 and line 386 to the clear terminal of device 374. The K input terminal of device 374 is coupled to the output of a NAND gate 388 through line 390. The inputs to gate 388 are connected for receiving a —Q1 signal at line 392 and an —N signal at line 394. These signals are representative, respectively, of one output of flip-flop 378 and an end timer counter period described at an output line of the same numerical designation in FIG. 16B. The J terminal of device 374 is coupled via line 396, while the Q output thereof having a "run" designation is provided at line 398 which is seen to be coupled to line 362 carrying a Q0 signal to device 361 described in connection with FIG. 15C. Line 398 extends to the J input terminal of flip-flop 378, while the K terminal input thereto is coupled to the output of a NOR gate 400 through line 402. The inputs to gate 400 are represented as the Q0 signal at line 362 and the —N signal commonly denoted as line 394. The preset (PR) terminal and clear terminals of device 378 are coupled to +5 v from respective lines 404 and 406, while the Q output is present at the earlier-described line 392 and the enabling Q output, labeled Q1, is provided at line 408. Line 408 extends to earlier-described line 363, the latter line representing one input to device 361 described in connection with FIG. 15C. Line 363 also extends to the input of inverter buffer 410, the output of which is at earlier-described line 136 carrying the signal designated —ENABLE; CNT disclosed in connection with block 178 in FIG. 12. Line 186 is seen coupled through pull-up resistor R2 to VCC.

Looking to FIG. 16B, the timer counter network utilized in conjunction with the above-described controller function is revealed. This counter network, as represented generally at 412 is formed of two counters 414 and 416 along with NOR gate 418. The user selected value for carrying out time interval measurement is inserted from earlier-described bus 346. In this regard, a first four components of that time modulus are asserted to the A-D inputs of counter 414 via bus component 420. Correspondingly, the second four components of the elected time are asserted from component 422 of bus 346 to the A-D input terminals of counter 416. An end of counting signal is directed from the RC terminal of counter 414 via line 424 to the T input terminal of counter 416. Each of the counters 414 and 416 are clocked from the 1 Hz clock described in conjunction with line 372 of FIG. 16A as represented, respectively, at lines 426 and 428. Counter outputs from counter 414 are provided at bus component 430 of bus 358, while the corresponding outputs of counter 416 are provided to bus 358 via bus component 432. An end of a counting period is recognized as a signal, —N at earlier-described line 394 which emanates from the RC terminal of counter 416 and is directed to one input of gate 418 along: with the earlier-described signal Q 1 from line 408. The output of gate 418 at lines 434 and 436 provides a load input signal to the load terminals of respective counters 414 and 416.

In FIG. 16A, flip-flop 374 is designated as a "run" flip-flop and responds to asynchronous inputs from lines 338 and 339. In this regard, the controlling PC software will provide initiating signals to commence a run which will be asynchronous with respect to the precise one second counting of the timer counter network 412. Similarly, should the operator wish to stop a counting run, such a signal will be an asynchronous input to flip-flop 374 via line 339. This asynchronous starting and stopping is accommodated for with the controller network as is represented in the state diagram of FIG. 16C. Looking to that figure, four states, a-d, are represented, respectively, by the circles 440–443. Above circles 440 and 443 is a columnar identification $Q_0=0$. This is the logic low condition of the Q terminal of run flip-flop 374 at line 398. Correspondingly, above state circles 441 and 442, $Q_0$ is noted as being equal to 1 or a logic high level condition for those states. To the side of circles 440 and 441, a condition $Q_1$, the output of flip-flop 378 at line 408 is shown to have a 0 or logic low value with respect to the states represented by circles 440 and 441. Correspondingly, state circles 442 and 443 are shown aligned with a representation that the logic level of $Q_1$ is a logic high or 1 for the above-noted logic values of output $Q_0$.

State a at circle 440 is a "load timer counter" state under a condition where a low logic level is present at lines 398 and 408. Any excursion reasserting that low logic level is represented by the loop line 446. In this regard, only a low true signal at the set run input at line 338 can cause the Q output of run flip-flop 374 at line 398 to assume a logic high value. For example, an input from line 386 to stop the system cannot cause that alteration at line 398. The start from state a is asynchronous. Assuming that a low true value is presented from line 338, then as represented by the dashed transition line 448, the controller network enters state b at circle 441 which remains titled "load timer counter". This is an asynchronous transition. However, $Q_0$ at line 398 now is at a logic high level while $Q_1$ at line 408 remains at a logic 0 level. On the next 1 Hz clock input from line 376, as represented by transition line 450, state c is entered as represented at circle 442 labeled "Enable Gamma Counters". In this state, output $Q_1$ at line 408 assumes a logic high level and output $Q_0$ at line 398 remains at a logic high level. Gate 418 (FIG. 16B) performs the Booleart OR function provided its inputs and output are defined as low voltage level true. Thus, a low voltage level at one input OR the other will cause a low voltage at the output of gate 418. As a consequence, whenever the $Q_1$ output of a flop-flop 378 is low binary counters 414 and 416 will be synchronously loaded with the initial value supplied by MD(0.7) on lines 346 and 422. This condition is present during states a and b. When the controller advances to state c, the voltage level at 408 goes high and timer counter 414 and 416 will increase the count with each one second clock. When this counter reaches a value which causes the —N variable at line 394 to go low true, the controller synchronously advances from state c to state a as seen at transition line 454 and the timer counter is reloaded with the initial value from MD (0..7) at line 346.

Should a stop command be received as a low true input at line 339, then an asynchronous event occurs as represented by dashed transition line 456 and the controller enters state d as represented at circle 443 labeled "Enable Gamma Counters". In this state, $Q_0$ transitions to a zero or logic low value while condition $Q_1$ at line 408 remains at a logic high level or 1. However, as represented by transition line 458 upon a next succeeding 1 Hz clock input to flip-flop 378, the controller transitions to state a.

As discussed in conjunction with the multiple channels block 190 in FIG. 12 and elaborated upon in the quad channel discussion in conjunction with FIG. 13, each of the 14 segments of the crystal assembly including seven segment arrays 82 and 110, is treated as a single channel for apparatus 10.

Figure 17A:
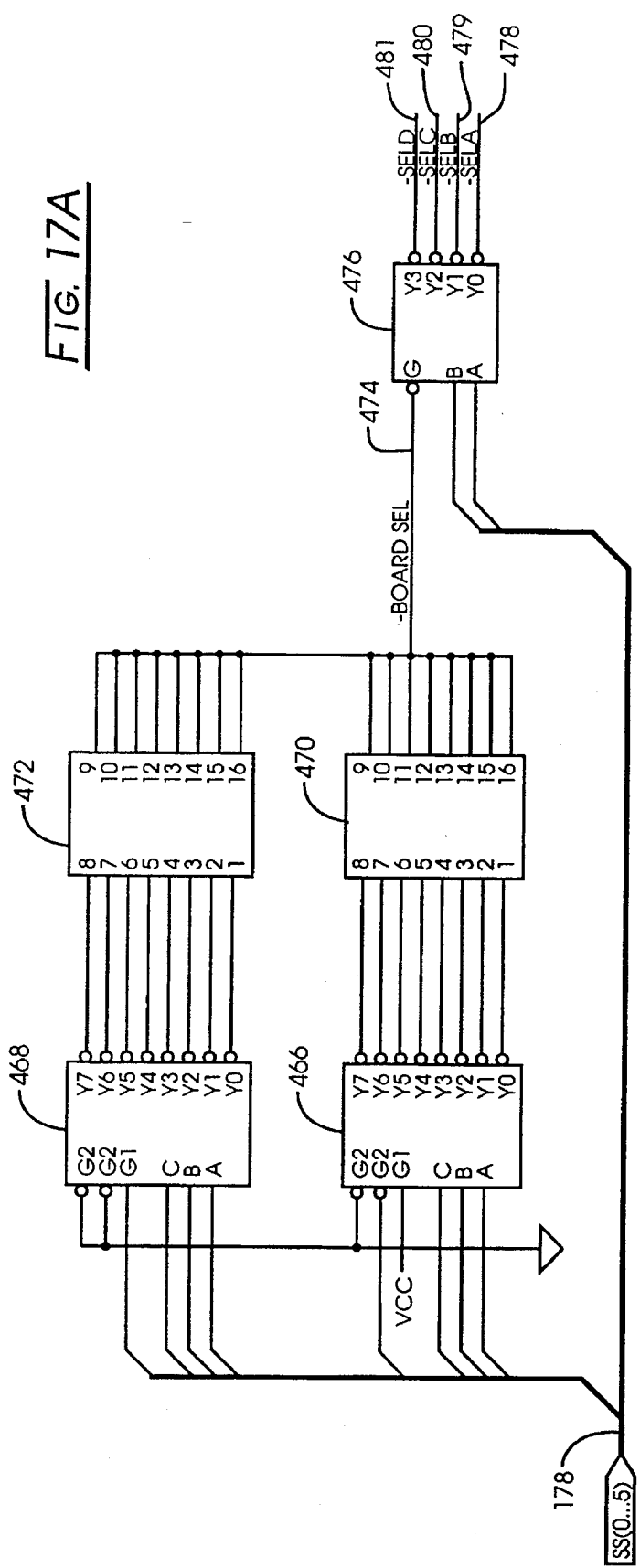
FIG. 17A is an electrical schematic diagram of selection circuitry employed with a quad channel circuit described in block form in FIG. 13.
Figure 17B:
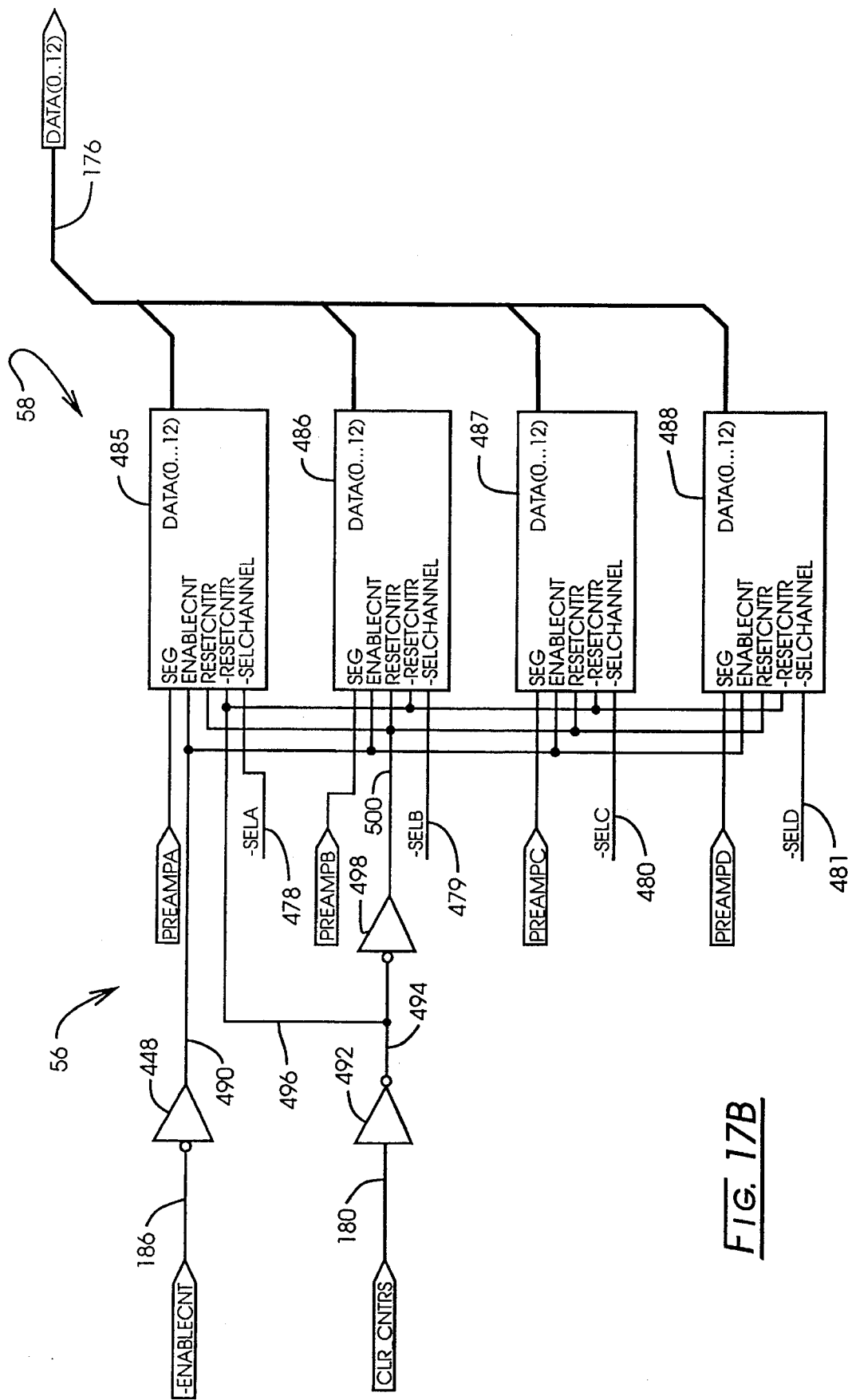
FIG. 17B is a block diagrammatic representation showing the components of a quad channel block of FIG. 13 at a higher level of detail.

Looking to FIGS. 17A and 17B, the quad channel network represented at 58 in connection with FIG. 13 is revealed at a next higher level of detail.

In FIG. 17A, a logic network is presented which selects the particular circuit board at hand as well as that one channel of the channels to be evaluated for gamma counts. In this regard, the channel select bus (SS (0...5)) again is represented at 178 being directed into three line to eight line decoders 466 and 468. It may be recalled that the selection at bus 178 is derived from latch 326 discussed in connection with FIG. 15B. Decoders 466 and 468 may be provided, for example, as type 74LS138. The output terminals Y0–Y7 of decoders 466 and 468 are transmitted to respective octal jumpers 470 and 472 which may be configured as represented at line 474 by the manufacturer to select the instant network. In this regard, two leads from bus 178 as well as the forward select output at line 474 are directed to a two line to four line decoder 476 which may be provided, for example, as the noted type 74LS139, the output of decoder 476 at four line array 478–481.

Referring to FIG. 17B, lines 478–481 reappear with respective discrete channels A-D as represented at blocks 485–488. Blocks 485–488 additionally receive the counter enable signal earlier described at line 186 from timer controller network 182. Because of the lengthy cable typically involved with the apparatus, this signal at line 186 is buttressed at a Schmitt trigger 488, the output of which, commencing at line 490 is directed to the "ENABLECNT" input of each of the channels 485–488 as labeled. In similar fashion, a clear counters input as earlier described at line 180 is buttressed at Schmitt trigger 492 and introduced via lines 494 and 496 to single channel networks 485–488 as a "—RESET CNTR" input. Line 494 additionally is directed to a next Schmitt trigger 498 having art inverted output at line 500 which is directed to each of the channel networks 485–488 as a "RESETCNTR" signal. The outputs from the preamplifier arrays as earlier described at coaxial line arrays 56 are presented for each channel, for example preamplifiers A-D, as a "SEG" input signal. The coupling of the networks 485–488 with data bus 176 is also represented in FIG. 17B.

Figure 18C:
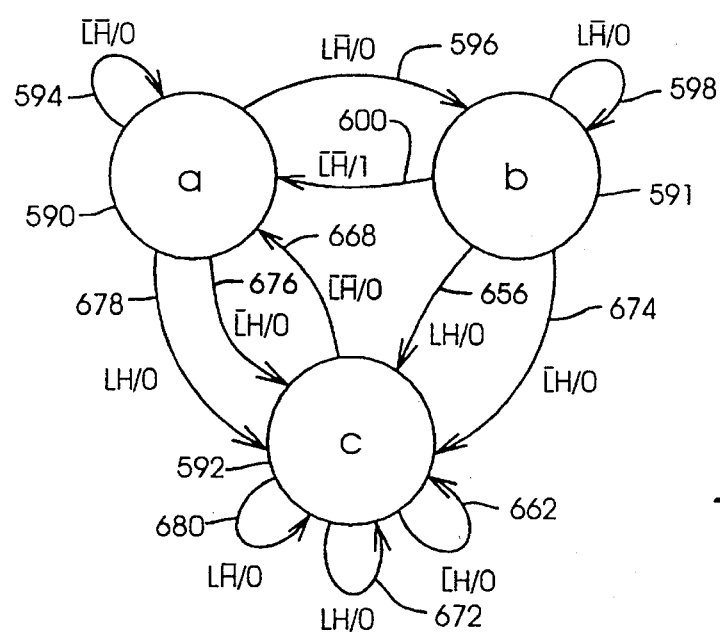
FIG. 18C is a state diagram describing a discriminator represented in FIG. 18B.
Figure 18A:
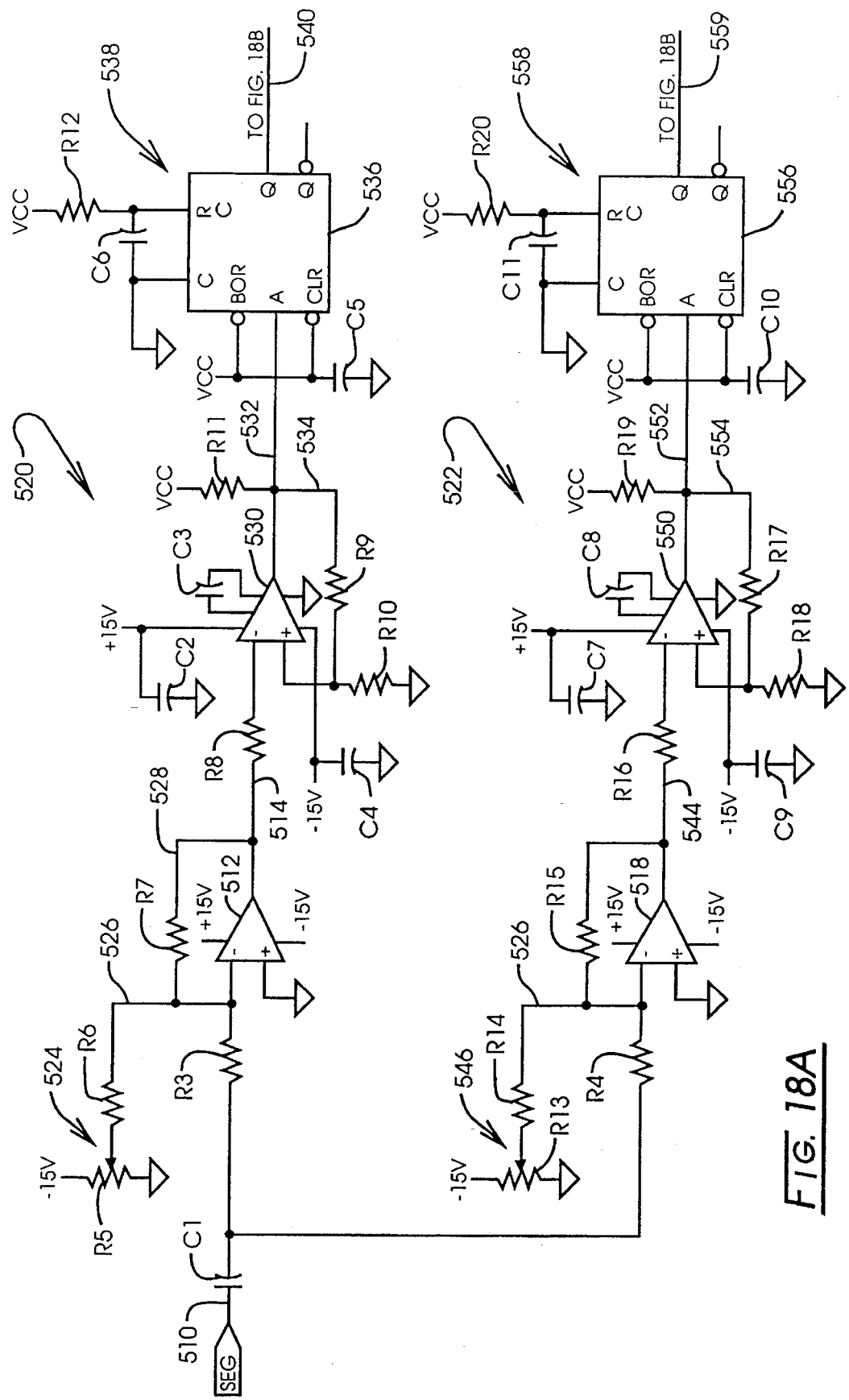
FIGS. 18A and 18B combine to describe a single channel signal treatment and counting circuit employed with a single block of the circuit of FIG. 17B.
Figure 18B:
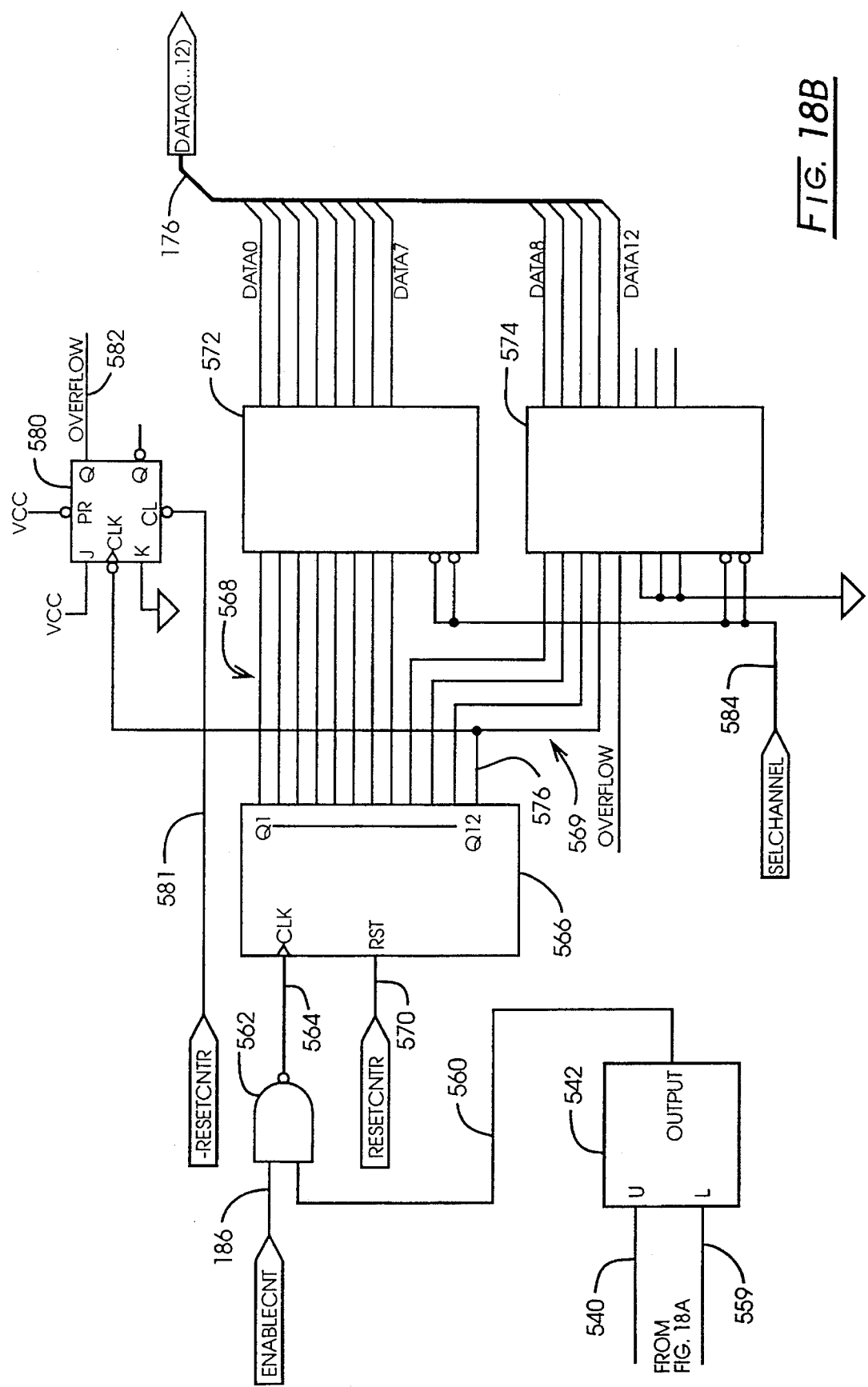

Referring to FIGS. 18A and 18B, the circuit representing a single channel, for example, channel A described at block 485 in connection with FIG. 17B, is illustrated. All of the single channels have the same configuration and include a signal treatment stage receiving the analog signal from an associated preamplifier and a gamma counting network which may be accessed by the controlling computer through the interface circuits to provide a count output for the channel.

Looking to FIG. 18A, an input from a preamplifier as labeled "SEG" is presented at line 510 which incorporates a blocking capacitor C1. The preamplified signal from line 510 is directed through a resistor R3 to one input of an inverting stage operational amplifier 512 which is seen to be coupled to +15 v as well as −15 v and provides an output at line 514. The same signal from line 510 is directed via line 516 and resistor R4 to the corresponding input of an inverting stage operational amplifier 518. Devices 512 and 518 may be provided, for example, as type LF412 operational amplifiers. With the arrangement shown, the preamplified signal is evaluated with respect to an energy amplitude window having an upper limit network 520 incorporating stage 512 which identifies spurious signals of amplitudes greater than those of the radionuclide being employed. In similar fashion, a lower threshold network 522 is developed incorporating stage 518 which functions to exclude those signals having energy amplitudes known to be below the radionuclide energies of interest and identify those having energy amplitudes above a lower threshold. With the exception of the threshold adjustment settings, the upper threshold network 520 is configured identically with the lower threshold network at 522. Looking initially to the upper threshold network 520, adjustment for the upper threshold value is provided by a potentiometer 524 which is depicted as incorporating resistor components R5 and R6. The wiper arm of potentiometer 524, incorporating resistor R6, is seen to be coupled via line 526 to line 510 extending to stage 512. The output of stage 512 at line 514 incorporates a feedback resistor R7 within path 528. With the arrangement shown, the negative voltage at line 526 extant at the wiper of potentiometer 524 is summed in a weighted manner with the voltage at the input to R3. Thus, a gamma event preamplified pulse is presented at line 514 as a negative-going waveform which is directed through resistor R8 to one input of a voltage comparator 530. Comparator 530 is configured with capacitors C2–C4 and is implemented with a regenerative feedback from its output line 532 incorporating resistors R9–R10 and path line 534. This arrangement provides a hysteresis form of performance to achieve a desirably defined pulse output corresponding with a gamma event. In this regard, the pulse output commences to be defined as the input voltage swings negative and then is fully defined when the input voltage returns to a predetermined positive level. Resistor R11 is a pull-up resistor coupled with +5 v and line 532.

The output of comparator stage 530, in effect, derives digital logic which must be clearly capable of interpreting a zero or one logic level. To clearly demark whether or not a gamma event or non-event is at hand, the signal at line 532 is submitted to the A input of a monostable multivibrator 536 which is configured having a filtering capacitor C5 coupled with the VCC input thereto and an RC network 538 incorporating resistor R12 and capacitor C6. The resultant output at line 540 is quite well defined and of consistent width regardless of the width of the input at line 532. Line 540 is directed to the U-input of a window discriminator represented at block 542 (FIG. 18B). Device 536 may be provided as a type 74HC4538.

Looking to lower threshold network 522, the output of inverting stage 518 is seen at line 544 and lower threshold adjustment is provided at potentiometer 546 having resistive components represented at R13 and R14. A resistor R15 is provided within a feedback path 548 and the output at line 544 is a negative going one as is the case in connection with line 514 of network 520. This output is directed through resistor R16 to one input of a comparator stage 550 having an output at line 552. Device 550 is structured identically with that at 530; is configured with capacitors C7–C9; and includes a regenerative feedback path including resistors R17 and R18, the path being designated at 554. A pull-up resistor R19 is coupled between output line 552 and VCC. As in the case of network 520, the pulse defined output at line 552 is directed to the A input terminal of a monostable multivibrator 556, the VCC input to which is filtered at capacitor C10 and which is configured with an RC network 558 incorporating resistor R20 and capacitor C11. This arrangment, as in the case of network 520, provides a well defined pulse of consistent width at output line 559 which is directed to the lower window, L, input of window discriminator 542. That pulse width is identical to the width of the pulse at line 540.

Looking to FIG. 18B, discriminator 542 provides a narrow width segment specific pulse output at line 560 where the zero-to-peak magnitude of the input waveform to the channel lies within the defined window. Where that is not the case, then there will be no output at line 560. Line 560 is directed to one input of a NAND gate 562, the opposite input to which is the counter enabling signal, ENABLECNT at line 186. With the presence of both signals, an output is presented at line 564 to the clock input of a binary counter 566 having a 12-bit output at lead arrays 568 and 569. Device 566 may be reset from the RESETCNTR signal as described in conjunction with FIG. 17B and here represented at line 570. The binary output of lead arrays 568 and 569 is submitted to respective tri-state drivers 572 and 574, the outputs of which are coupled with bus 176. The last output at line 576 of counter 566 also is tapped at line 578 and asserted at the clock input of a JK flip-flop 580. Device 580 is reset from line 581 with the —RESETCNTR signal as described in conjunction with FIG. 17B, and provides an output designated as OVERFLOW at line 582 which is submitted at driver 574 for transmission to the computer function. In this regard, line 582 reappears at driver 574. Devices 572 and 574 are enabled by the —SEL CHANNEL signal as described in conjunction with FIG. 17B and seen at line 584 in the instant figure. Device 566 may be provided, for example, as a type 74HC4040, while devices 572 and 574 may be provided as type 74LS244.

Figure 18D:
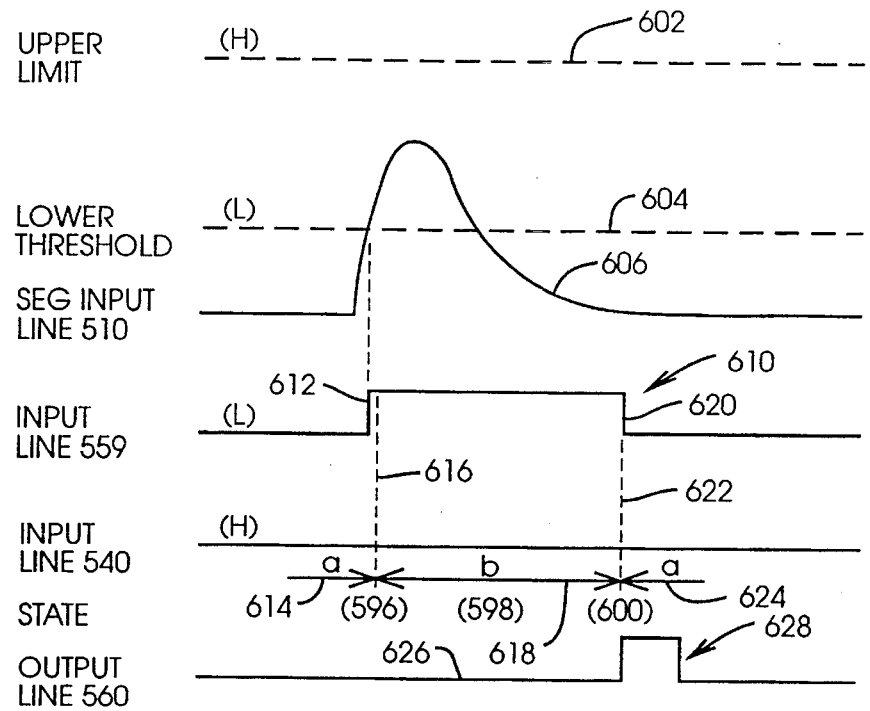
FIGS. 18D and 18E are curve and state combination drawings illustrating the performance of the state diagram of FIG. 18C.
Figure 18E:
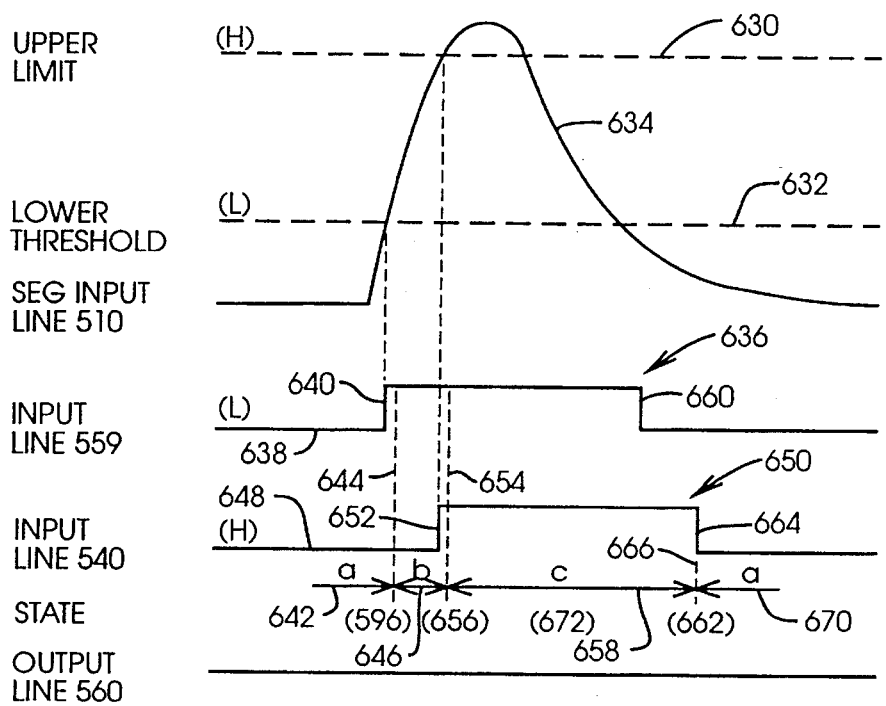

Referring to FIGS. 18C–18E, a state diagram illustrating the logic and associated operation of discriminator 54 is set forth. The diagram of FIG. 18C is discussed in conjunction with demonstration curves set forth in FIGS. 18D and 18E. The diagram of FIG. 18C is based upon a Mealy model wherein outputs are defined on the transitions between states. In the diagram, a slash configuration is used wherein the LH designation adjacent a slash represents the low threshold-high threshold input combination of pulse signals of constant width at output line 560. On the opposite side of the slash is an output shown as either a zero or one which results from the indicated input combination and state transition. In the figure, three states designated a-c are represented by the respective circles 590–592.

The state diagram shown is one of a fundamental mode design which is sometimes referred to as an unclocked sequential circuit. In this regard, advantageously no recurrent clock is required to orchestrate the logic. For the channel circuits as described in conjunction with FIG. 18A to perform in conjunction with a discriminator, it is necessary that pulses which extend above the lower threshold established by network 522 are recognized under the condition that those pulses do not extend above the upper limit established by network 520. By employing the fundamental mode design without a clocked sequencing of transitions, an avoidance is made of unwanted metastable stage conditions which may otherwise occur with the interference of a clock event with a gamma responding pulsing event. Resting state a at circle 590 is one wherein there is no pulse signal present from either of the networks 520 or 522, i.e. $\overline{LH}/0$. As represented at transitional loop 594, that condition simply provides for the retention of stage a. However, should a pulse commence, for example having been derived at lower threshold network 522, then as represented by transition are 596, a transition is made to state b represented at circle 591. The condition of $L\overline{H}/0$, if continuing or reoccurring will cause the maintenance of state b as represented by the transition loop 598. However, if the pulse output from monostable multivibrator 556 is sustained without the presence of a signal output from device 536, then a transition represented by transition arc 600 occurs with a corresponding output from discriminator network 542 at line 560. The condition then may be represented as $L\overline{H}/1$.

Looking momentarily to FIG. 18D, this performance of the discriminator may be illustrated in connection with pulse levels and input signals. In the figure, the upper or high limit level as established at comparator 530 is represented by level line 602. Correspondingly, the level line for the lower threshold is depicted as a line 604. An input signal, for example as developed at line 510, is represented by the curve 606 as extending above lower threshold line 604 but below upper limit line 602. Thus, the pulse represented by curve 606 is a valid one. The pulse generated by lower threshold network 522 at line 559 will develop a pulse of consistent width having a rising edge commencing as the curve 606 passes or encounters the lower threshold level as represented at line 604. This condition will cause a commencement of the generation of a pulse of predetermined width at line 559 and such pulse is represented generally at 610 having a rising edge 612 occurring as the curve 606 reaches or encounters the lower threshold level represented at line 604. Up to this point in time, the state represented at FIG. 18C will be state a as represented at time line 614. In this regard, as represented by state dividing line 616, just following the occurrence of a rising edge 612 of pulse 610, the transition represented by transition arc 596 occurs. That number is reproduced in FIG. 18D in parenthesis below line

616. Then, as determined by the width of pulse 610, and shown by time line 618, state b, a condition represented by transitional loop identifying number 598, is in effect. The transitional loop 598 is shown in FIG. 18D in parenthesis. As the falling edge 620 of pulse 610 occurs, as shown in conjunction with state dividing line 622, the transition represented by transitional arc 600 occurs within a finite interval. The number 600 is reproduced in FIG. 18D in parenthesis in conjunction with state dividing line 622. Then, as represented by time line 624, state a reoccurs. As the transition represented by transition arc 600 occurs, a pulse of finite duration occurs at output line 560 as represented at curve 626 and the output pulse thereon at 628.

Now considering a condition wherein a signal representing an illegal gamma event not only passes the lower threshold, but also is of such magnitude as to pass the upper limit, reference is made additionally to FIG. 18E. In the figure, the upper limit (H) is represented by level line 630, while the corresponding lower threshold is represented by the level line 632. An incoming signal at line 510 then may be represented by the signal defining curve 634 which not only passes the lower threshold represented at line 632, but also the upper limit as represented at line 630. The signal represented by curve 634, therefore, is one which is to be rejected by the discriminator network 542. As the signal magnitude initially encounters the lower threshold as represented by line 632, then a lower threshold pulse will be generated as represented by the pulse 636 at curve 638. The rising edge 640 of pulse 636 will occur as the signal represented by curve 634 encounters the lower threshold level represented at line 632. As represented at time line 642, state a will have occurred up until this point in time as delineated by state dividing line 644. Transition arc identifying number 596 in parenthesis is located below line 644 to indicate that transition now occurs to state b as represented by time line 646. Next, the signal represented by curve 634 will encounter and pass the upper limit represented by line 630. Accordingly, a signal at input line 540 as represented at curve 64 will commence to define a pulse 650 at the rising edge 652 thereof. As this occurs, a transition, LH/0 occurs as defined at state dividing line 654 and represented in FIG. 18C as transition arc 656. The result is the assumption of state c as represented at circle 592 in that figure. This state c is depicted in FIG. 18E at time line 658. The transition 656 is shown in FIG. 18E by that number in parenthesis beneath state dividing line 65. Pulses 636 and 650 are of the same width and, thus, the falling edge 660 of pulse 636 next will occur to develop the condition LH/0 represented in FIG. 18C as loop transition 662. That number is reproduced in FIG. 18E at the state c time line 658 beneath falling edge 660 in parenthesis. The logic level at curve 638 now is at a logic low while the logic level at curve 648 remains at a high level as a continuum of pulse 650. Then, with the occurrence of the falling edge 654 of pulse 650, state c terminates as represented at state dividing line 666 and the condition is now $\overline{LH}/0$, a transition represented in FIG. 18C at transition arc 668. State a then ensues as represented at time line 670 in FIG. 18E. It further may be observed in FIG. 18E that during the coincidence of both pulses 636 and 650, the condition LH/0 will be present. This is represented in FIG. 18C at the loop transition 672.

The state diagram of FIG. 18C additionally shows other possible logic events and the results therefrom. For example, the presence of a condition $\overline{LH}/0$ in connection with state b will result in the transition represented by transition arc 674 providing a transition to state c. That same condition when occurring during state a will result in transition to state c as represented at transition arc 676. Similarly, a condition LH/0 occurring during state a will result in a transition to state c represented by a transition arc 678 and, finally, an event represented as L $\overline{H}$/0 occurring during state c results in the retention of state c as represented by loop transition 680. The implementation of the state diagram of FIG. 18C may take a variety of forms depending upon the desires of the designer as demonstrated, for example, in the implementation of the state diagram of FIG. 16C. For example, the logic represented in the diagram may be provided by a programmable logic device (PLD) such as type EPM 5130 EPLD marketed by Allera Corporation of San Jose, Calif.

Figure 19:
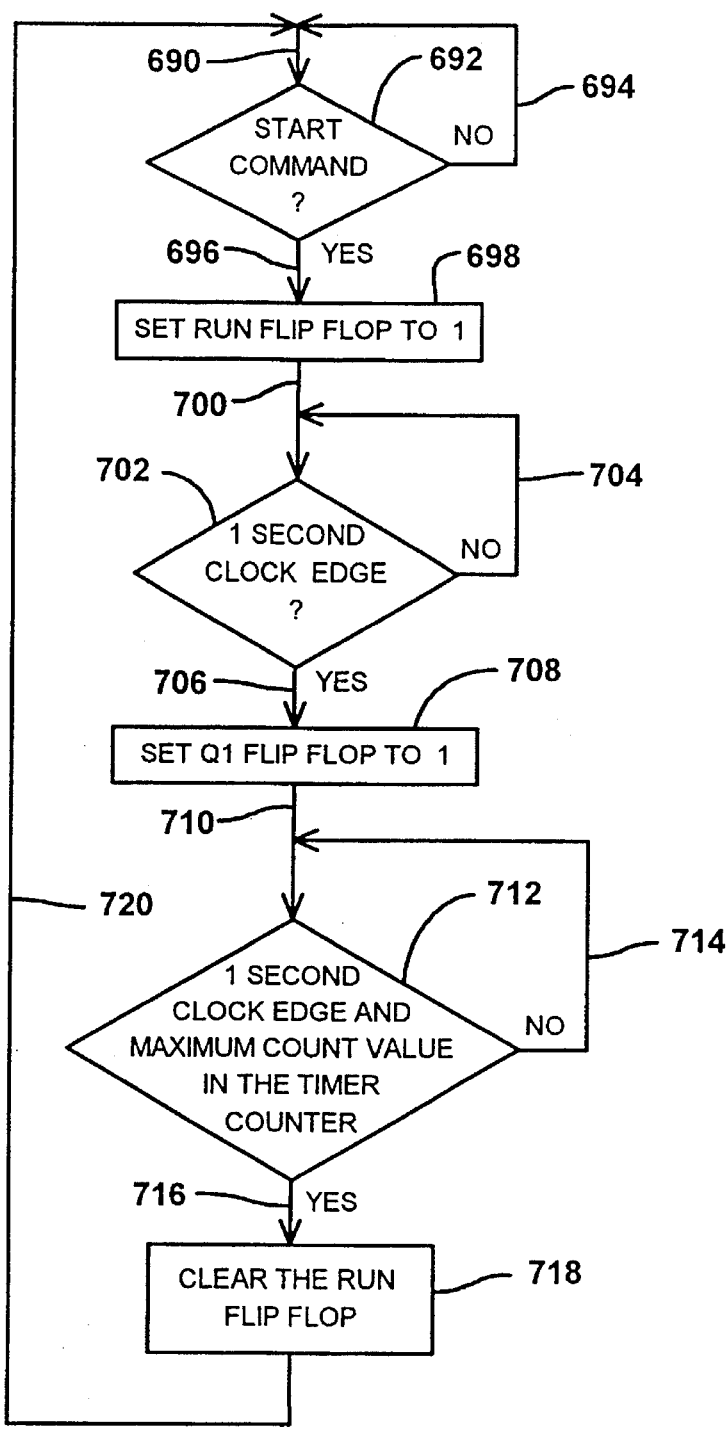
FIG. 19 is a flow chart showing the general operation of the controller described in conjunction with FIGS. 16A and 16B.

Referring to FIG. 19, a flow chart generally describing the interaction of computer control with respect to the controller network 182 described in conjunction with FIG. 16A is set forth. The program commences with input at line 690 to the query posed at block 692 determining whether or not a start command has been received from the user. In the event of a negative determination, then as represented by loop line 694, the system returns to line 690 and dwells awaiting such a command. However, with an affirmative determination, then as represented at line 696 and block 698, the run flip-flop 374 is set to provide a logic high output at line 398. The program then continues as represented at line 700 and the inquiry at block 702. This query determines whether the clock edge of the 1 Hz clock has been received. If not, then as represented at loop line 704, the system dwells until that clock edge is received. With the receipt of the clock edge, as represented at line 706 and block 708, the Q1 output thereof at line 408 is set to a logic high level. It should be observed that while the Q1 condition is at a logic low or zero, the timer counters of network 182 are loaded with elected values. Correspondingly, the Q1 signal at line 408 is at a logic high level, the timer counters of network 182 are incremented by the one second clock. Upon setting the flip-flop 378 to provide a Q1 logic high value, the program progresses as represented at line 710 and block 7 12 wherein a determination is made as to whether the maximum count value inserted into the timer counters has been reached. In this regard, the timer counters count up to the value inserted in them. In the event that a negative determination is made with respect to the inquiry, then as represented at line 714, the system dwells until the maximum count has been received in synchronism with the clocking procedure. Where that maximum count value has been received in synchronism with the clock, then as represented at line 716 and block 718, the run flip-flop 374 is then cleared and, as represented at line 720, the program returns to line 690.

Figure 20:
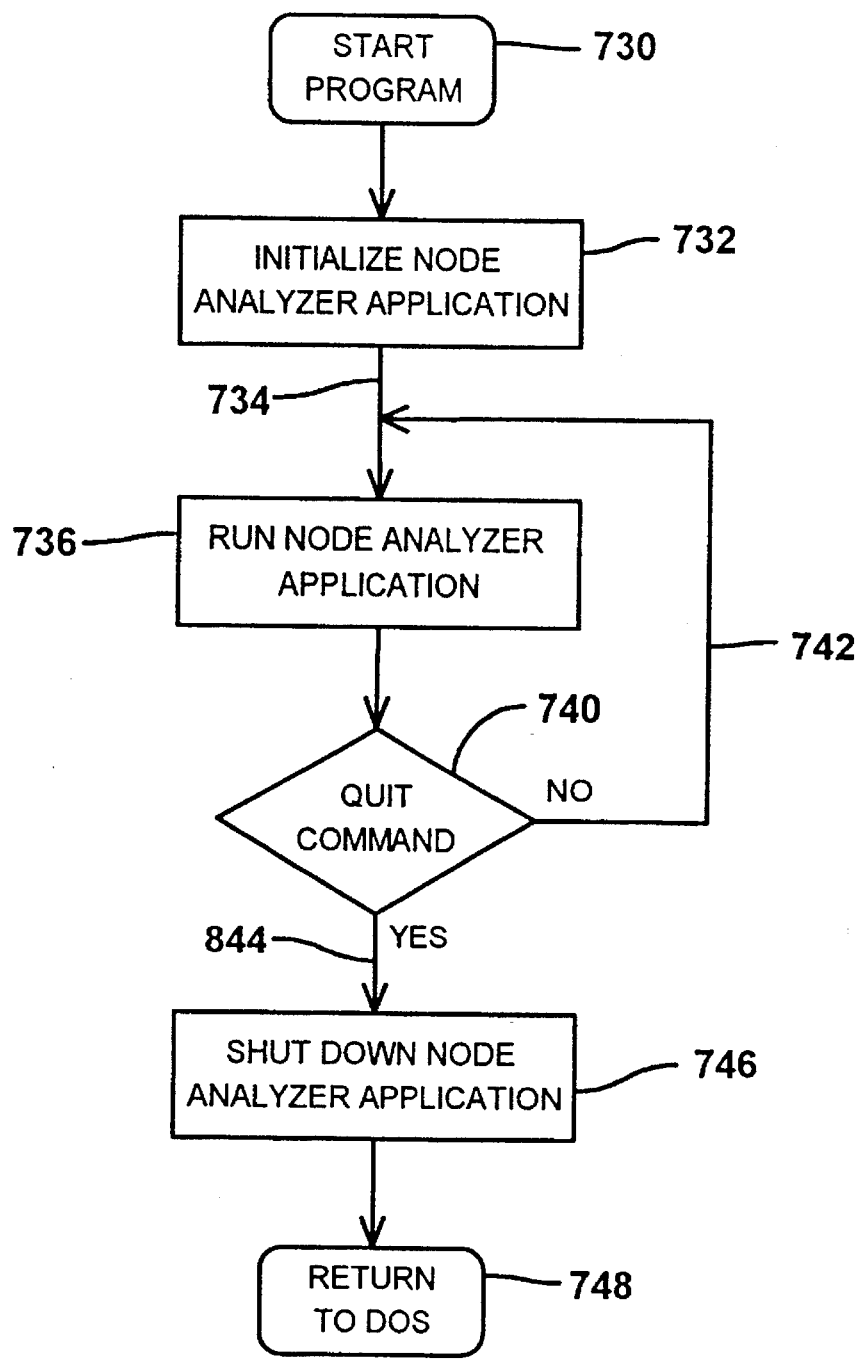
FIG. 20 is a highest level software flow chart for the operation of the system of the invention.

Referring to FIG. 20, a high level flow chart is presented as to the overall operation of the system at hand. The program starts as represented at node 730 and progresses to the instructions at block 732 providing for an initialization of the node analyzer application. In this regard, initialization includes initialization of the DeskTop, menu bar, and status bar as discussed in connection with the screens. The computer interface is initialized as well as flags and data records in memory. The application data display window on the screen is open as well as the data overflow warning line at the bottom of the screen. All gamma counters are reset to zero, flip-flop 378 is set so that its Q1 output is zero, and memory is allocated, and the program then continues as represented at line 734 and block 736. The program then enters the event driven run node analyzer application which is discussed in enhanced detail in connection with FIGS. 21A and 21B. As represented at line 738 and block 740, a determination is made as to whether a quit command has been received from the user. In the event it has not, then the run application continues as represented at loop line 742. Where a quit command has been received, then as represented at line 744 and block 746, the analyzer is shut down and, as represented at node 748, the program returns to DOS.

Figure 21A:
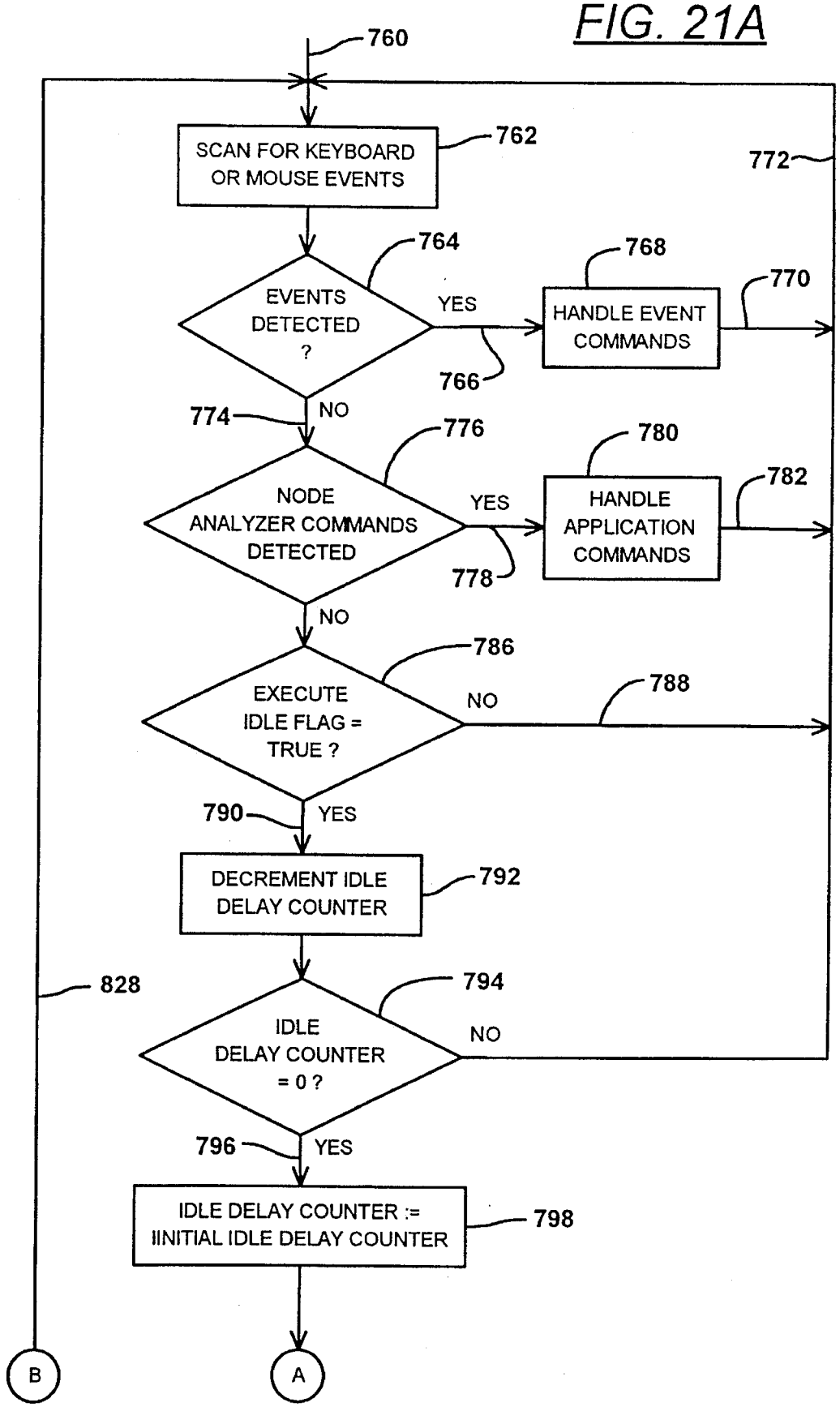
FIGS. 21A and 21B combine to illustrate a flow chart for a run application of the system of the invention.
Figure 21B:
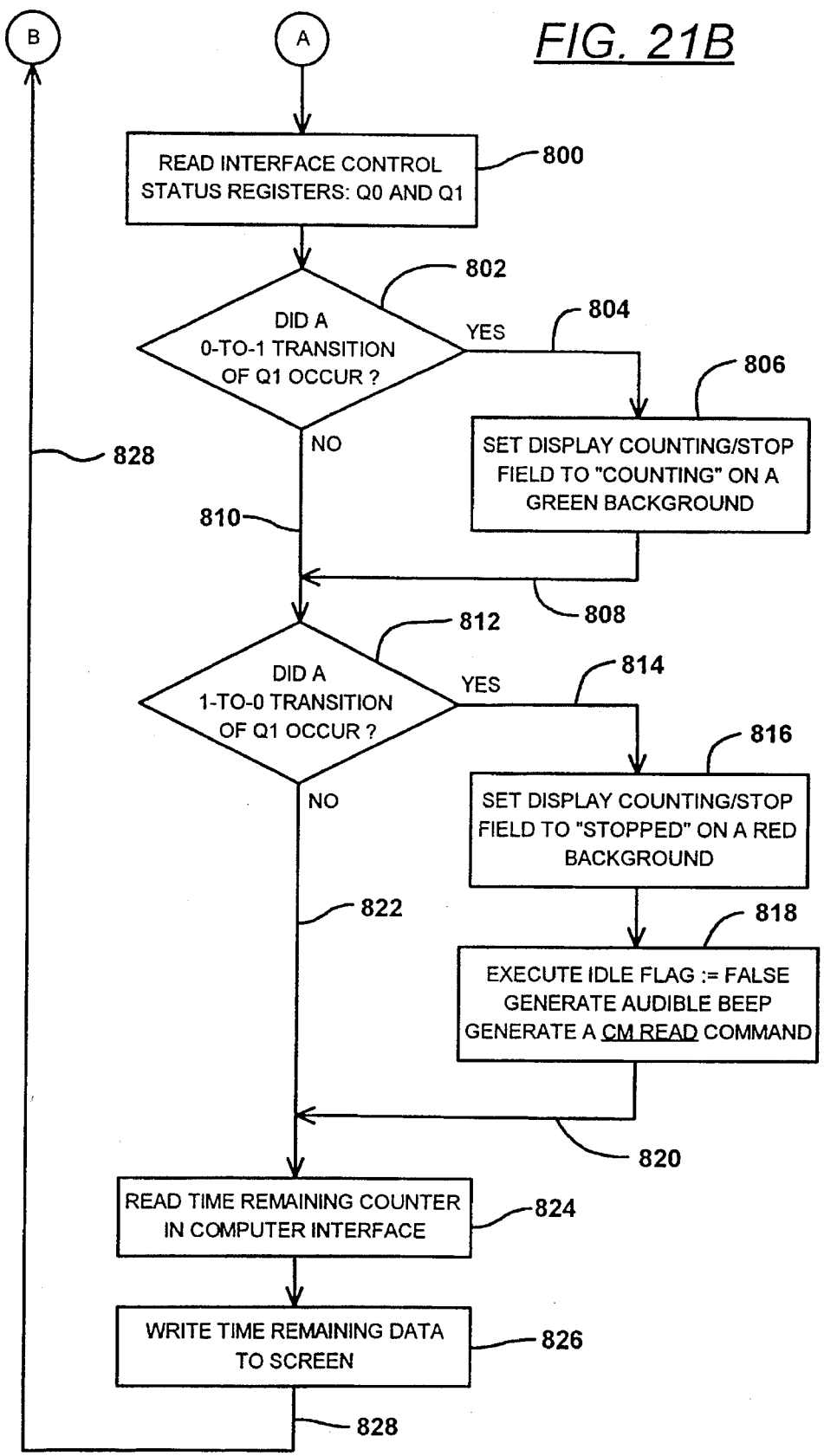

Turning to FIGS. 21A and 21B, the run node analyzer application program is seen to commence at line 760 leading to the instructions at block 762 where the event driven software scans for keyboard or mouse events. Where this scanning detects such an event, as represented at block 764, line 766 and block 768, the user inserted events are handled and, as represented at line 770 and 772, the program loops in return to line 760. In the event no keyboard or mouse events are detected., then as represented at line 774 and block 776, an inquiry is made as to whether the node analyzer commands have been detected. As distinguished from the events of block 764, these commands are event driven as are seen on the screen of the PC. Where such commands are detected, then as represented at line 778 and block 780, the application commands are handled and as represented at lines 782 and 772, the program returns to line 760. The activities associated with block 780 are described at an enhanced level of detail in connection with FIG. 21. Where no node analyzer commands are detected, then as represented at line 784 and block 786, a determination is made as to whether an idle flag and software is true. Where no other activities in software are taking place, an opportunity is made in the software to implement a software timer which is employed to determine the number of fractions of a second which have transpired. This counter is referred to as a "idle delay counter". Where the idle flag is not true, then as represented at lines 788 and 772, the program returns to line 760. On the other hand, where the idle flag is true, then as represented at line 790 and block 792, the idle delay counter is decremented and, as represented at block 794, a determination is made as to whether the idle counter is at a zero value. In the event that it is not, then as represented by line 772, the program returns to line 760. Where the idle delay counter is at a zero valuation, then as represented at line 796 and block 798, the idle counter is restored to its initial value. Next, as represented at block 800, the output of run flip-flop 374 at line 398 ($Q_0$) is read as well as the output of flip-flop 378 at line 408 ($Q_1$). It may be observed that this readout occurs following completion of a full count at the idle delay counter.

The program then looks to the query at block 802 and determines whether a zero-to-one transition with respect to condition $Q_1$ at line 408 occurred. If that is the case, then as represented at line 804 and block 806, an ongoing counting indication is displayed at the screen of the PC. At this point in time, the gamma event counters of network 182 are enabled. The program continues as represented at lines 808 and 810, the latter line also representing the progression from a negative determination with respect to the querry at block 802. Line 810 extends to block 812 where a determination is made to whether a 1-to-0 transition of the $Q_1$ output of flip-flop 378 at line 408 occurred. In the event that that transition did occur, then as represented at line 814 and block 816, the display), of the PC is updated, for example publishing the term "stopped" on a red background. Then, as represented at block 818, the idle flag is returned to a false as opposed to a true condition in view of the determination of enablement of the gamma counters. A cuing beep sound is generated as well as a command to read the values at the gamma event counters for 14 channels. The program then proceeds as represented at lines 820 and 822 in the same manner as is occasioned with the negative determination with respect to the query at block 812 to the instructions at block 824 where the time remaining counter is read. As represented at block 826, the time remaining data is written to the PC screen and, as represented at loop line 828, the program returns to line 760.

Figure 22B:
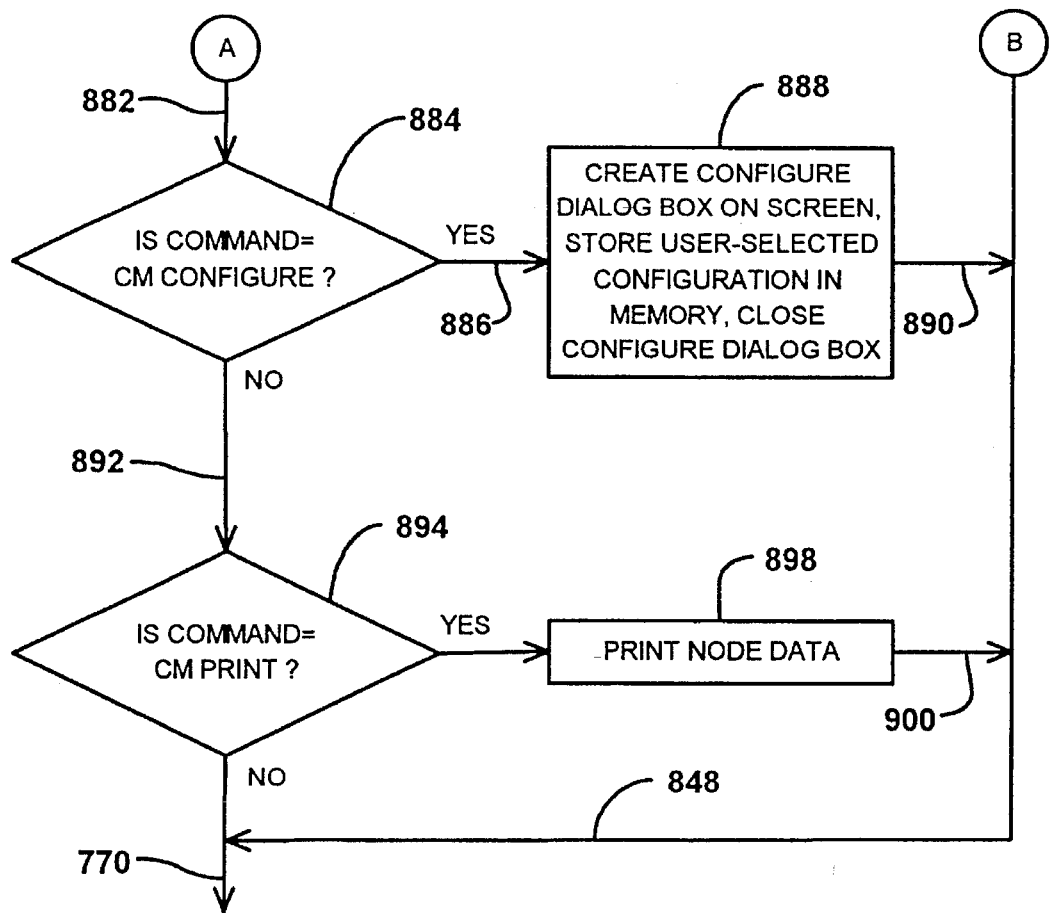

Referring to FIG. 22, the program associated with block 780 in FIG. 21A is revealed commencing with the: earlier-noted line 766. Line 766 extends to the query posed at block 840 where a determination is made as to whether the application command is one for accepting and loading data. In the event that it is, then as represented at line 842, the instructions identified in blocks 844–846 are undertaken. In block 844, counting time as displayed is read and written to the interface as described in conjunction with FIG. 15. Next, as represented at block 845, the time remaining is read from the interface and written to the display. Next, as represented at block 846, the user is prompted to select the start button and, as represented at line 848, the routine diverts to ending line 770.

Where the query at block 840 results in a negative determination, then as represented at line 850 and block 852, a determination is made as to whether an event driven command to start occurred. In the event that it did., then as represented at line 854 and blocks 856–858 a sequence of instructions occur. The instructions at block 856 provide for clearing the gamma cameras and writing zeroes into the display at the personal computer. Block 857 provides for setting a start-bit in the interface network which has been described at FIG. 15. Then, that start bit is cleared in the interface for the purpose of generating a form of 0-1-0 signal for transmission along the relatively long cable between the PC and apparatus 10. Block 858 contains instructions for executing the idle flag to a true condition such that the idle loop can be implemented. The program then diverts as represented at line 860 to line 848 and exiting line 770.

Where the query at block 852 results in a negative determination, then as represented by line 862 and block 864 an inquiry is made as to whether an event has developed a command to stop. Where that is the case, then as represented at line 866 and block 868, the stop bit in the interface network is set and then cleared. This is for the same reason as provided in block 857, a defined but narrow pulse being generated with the instructions. The program then exits via lines 870 and 848 to line 770.

Where the inquiry posed at block 864 results in a negative determination, then as represented at line 872 and block 874 a query is made as to whether the event based command is a read command. In the event that it is, then as represented at line 876 the program looks to the instructions at blocks 878–879. The tasks carried out with respect to block 878 include the reading of the gamma counters associated with each of the 14 channels, as well as the detection of any counter overflows as discussed in connection with device 580 in FIG. 17B. Counter data is written to the screen of the PC monitor and the background at that monitor is made red if an overflow is present. The background is set to red in the, event of an overflow and an overflow warning status in red is developed at the monitor in the event of any overflow condition. Block 879 provides for the selecting of the print start component of the screen as a prompt to the operator and this portion of the program then exits as represented at lines 880 and 848 to exit line 770.

Where the query posed at block 874 results in a negative determination, then as represented at line 882 and block 884, a determination is made as to whether an event has called for a configure command. In the event of an affirmative determination, then as represented at line 886 and block 888, a dialogue box is created on the screen of the monitor associated with the PC:. The user may then, for example, elect which of the 14 segments are to made active, following which those elections are placed in memory and the dialogue box is closed. The program then exits as represented at lines 890 and 848 to exit line 770.

Where the query posed at block 884 results in a negative determination, then as represented at line 892 and block 894 a query is made as to whether the event command calls for a printing. In the event that it does, then as represented at line 896 and block 898, the count data for each segment is printed to provide a permanent record. The program then exits as represented by lines 900 and 848 to exit line 770.

Figure 23:
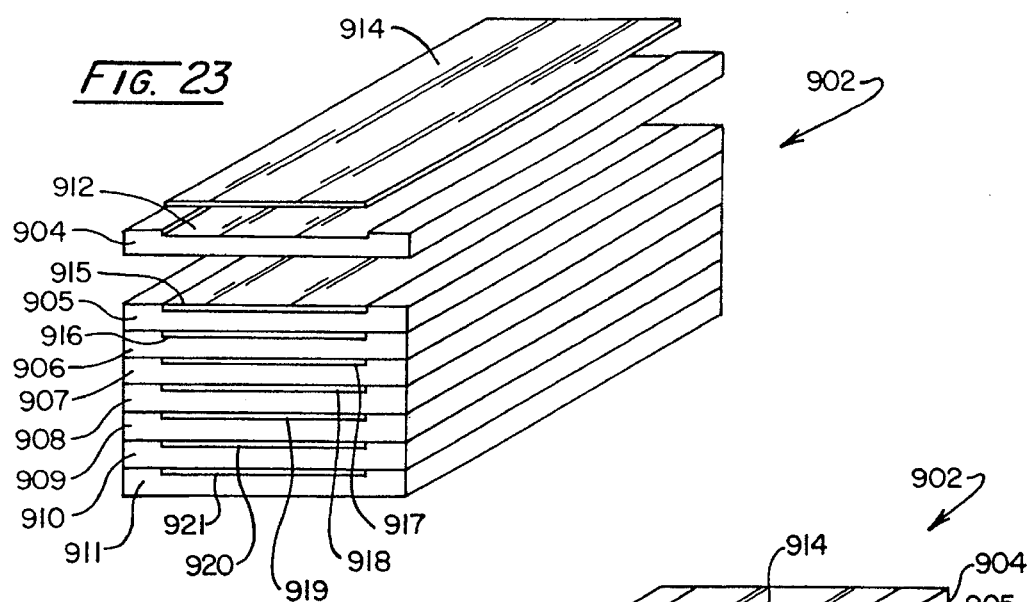
FIG. 23 is a perspective view of a collimator forming assembly employable with the apparatus of the invention and showing certain portions thereof in exploded fashion.
Figure 24:
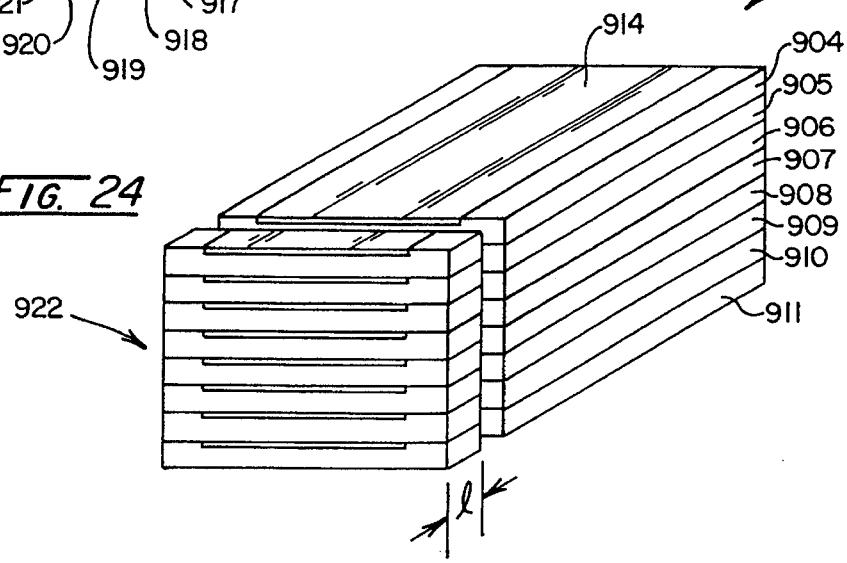
FIG. 24 is a perspective view of the forming assembly of FIG. 23 with a portion thereof cut away to derive a collimator.
Figure 25:
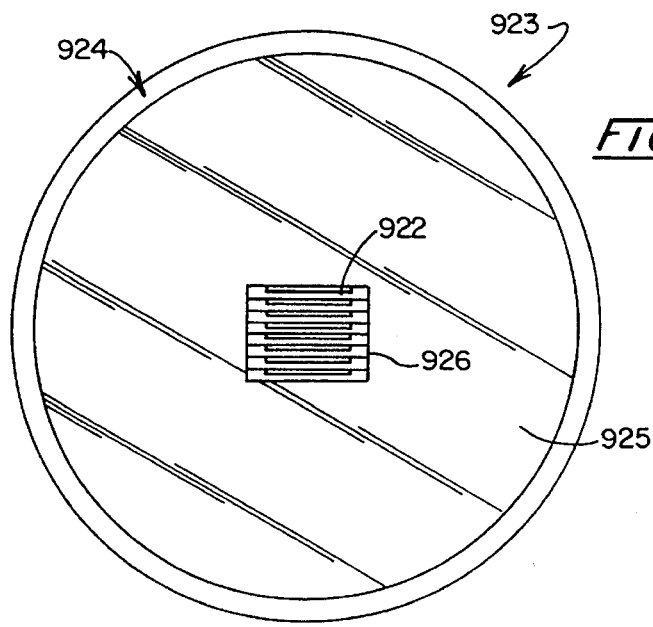
FIG. 25 is a top view of a positioning assembly utilizing the collimator shown in FIG. 24.

Radiation source location for a tissue sample such as lymph node 26 can be developed with a higher level of precision with the expenditure of slightly greater counting times. This is provided through the utilization of a collimator matching the segment pattern of the crystal segment array seen and described in connection with FIGS. 3A and 6. The formation of such collimator is described in connection with FIGS. 23 and 24. Looking to FIG. 23, a collimator forming assembly is shown at 902 as formed of a sequence of eight polymeric spacing structures 904–911. Formed of durable plastic, for example such as polycarbonate, the elongate spacing structures 904–911 are each configured having a generally rectangular cross section, within one flat face of which there is formed a wide elongate groove as seen at 912 in the case of facing structure 904. The grooves as at 912 each are configured to receive a thin foil 914 of attenuating material such as lead. For example, the foil 914 may be 0.010 inch thick. Groove 912 is shaped to precisely receive foil 914 and the depth of the groove 912 and foil 914 are such as to correspond with the spacing between the segments of crystal arrays such as at 86–92 as described in conjunction with FIG. 6. The width of the groove 912 and corresponding foil 914 is such as to span across two adjacently disposed crystal segments. For example, referring to region 30 in FIG. 3A, the widthwise extent of the foil 914 would correspond with the widthwise extent of combined segments 1 and 8. Foil inserts for spacing structures 905–911 are represented, respectively, at 915–921. The assemblages of spacing structures and foil are joined together in stacked form and adhesively interconnected so as to define a long collimator grid which geometrically conforms with the geometry of the crystal segment assemblage. Then, referring additionally to FIG. 25, a length, l, from the assemblage 902 may be cut-off and the assemblage then positioned over and in segmental alignment with the crystal segment assembly. Such a collimator is represented in FIG. 25 at 922 having been severed from the assembly 902. The length of the collimator 922 as represented at l, may for example, range from about 2 mm to 8 mm. As the length or height l of the collimator increases, the resolution of the system at hand becomes higher, however, the interval required for counting gamma events requires expansion. That count interval will vary depending upon the strength of the source at hand. Experience with the utilization of collimators as at 922 shows that rather high resolution counting can be developed with a maximum of about 100 seconds of counting.

To facilitate the positioning of a collimator such as at 922 in registration over the crystal segment array, a positioning assembly as seen in FIG. 25 at 923 may be employed. Assembly 923 may be formed of a clear polymeric material such as the noted polycarbonate and is configured having an outer annular shaped rim represented generally at 924 which surmounts a base 925 within which a rectangular opening 926 is formed. The collimator 922 is mounted within this opening 926 and retained therein, for example, adhesively.

Figure 26:
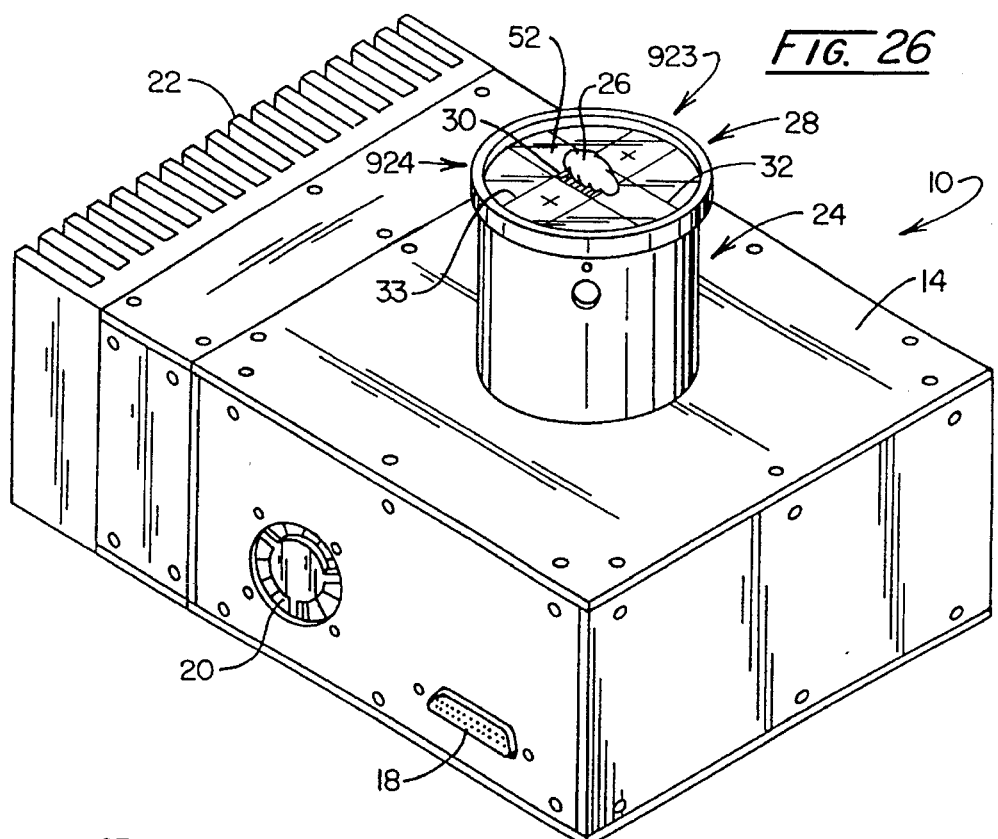
FIG. 26 is a a perspective view of the apparatus of FIG. 1 showing the positioning assembly of FIG. 25 located thereon.
Figure 27:
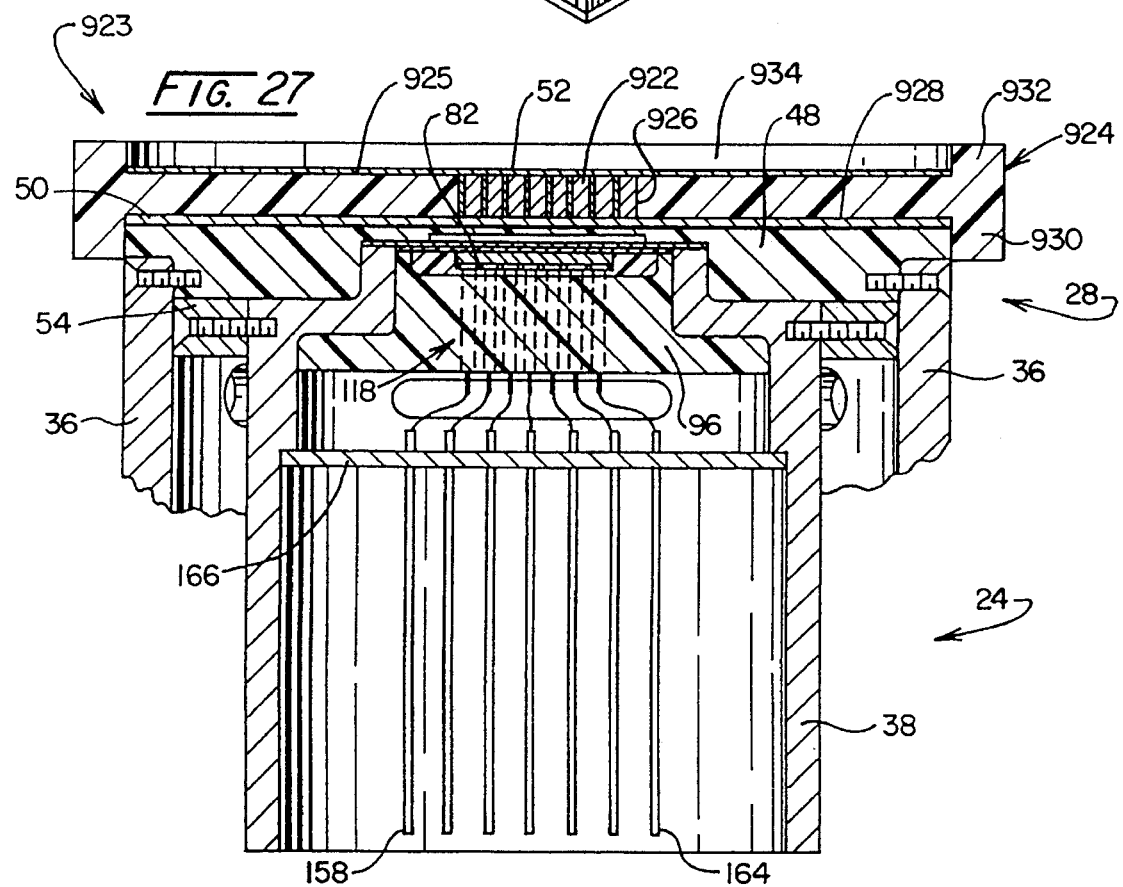
FIG. 27 is the section view shown in FIG. 9 with the positioning assembly shown in FIG. 26 therewith in sectional fashion.

Turning to FIGS. 26 and 27, assembly 923 is seen in operational association with apparatus 10. In this regard, the rim 924 is seen having a lower annular portion 930 which defines a base lower surface 928. Lower annular rim portion 930 aligns the positioning assembly 922 upon apparatus 10 by extending over protective cover 50 and end cap 48. The rim lower portion 930 precisely aligns the collimator 922 over the widthwise extent of the paired segments as described above.

Rim 924 also extends upwardly to define a rim upper portion 932 which forms a positioning cavity 934 for receiving a disposable sample support 52 as described in connection with FIG. 3A. The arrangement is shown in position on apparatus 10 in FIG. 26. As before, the disposable sample support 52, now positioned within cavity 934, may be rotated by the simple expedient of rotating the outer rim 924 of positioning assembly 923.

Since certain changes may be made in the above system, method and apparatus without departing from the scope of the invention herein involved, it is intended that all matter contained in the above description or shown in the accompanying drawings shall be interpreted as illustrative arid not in a limiting sense.

We claim:

1. Apparatus for locating the situs of photon emissions from a tissue sample, comprising:

a radiation responsive crystal assembly having a plurality of segments discretely responsive to said photon emissions, each with a lower disposed surface for providing a crystal output and an upwardly disposed surface for receiving said emissions, said segments being arranged in a predetermined pattern;

a base assembly for supporting said crystal assembly segments at a said lower disposed surface thereof;

a platform assembly transparent to said photon emissions, positioned over said crystal assembly, having a receiving region for receiving said tissue sample located over said plurality of segments and having indicia identifying the location of each said segment;

a signal treatment network responsive to said crystal output of each said segment for deriving a segment specific pulse output corresponding with each valid said photon emission from said tissue sample when positioned at said receiving region;

a counting circuit responsive in the presence of an enable input to count each said segment specific pulse output to derive a segment count value; and a control and compiling system responsive to a start command for deriving said enable input, including a timing network actuable with said start command for determining the time interval during which said segment count value is derived, responsive to compile said segment count value for each said segment and derive a visually perceptible readout of each such compiled segment count value.

2. The apparatus of claim 1 in which said crystal assembly comprises two adjacently disposed arrays of said segments.

3. The apparatus of claim 2 in which:

each said crystal assembly segment has a rectangular periphery of predetermined widthwise and lengthwise extents, said lengthwise extent being of greater dimension than said widthwise extent;

said segments within a said array being positioned in sequential mutual adjacency from first to last along said lengthwise extents; and said segments of said two adjacently disposed arrays being mutually adjacently disposed in sequential alignment from said first to last along a said widthwise extent thereof.

4. The apparatus of claim 3 in which each said segment has a width of about 2 mm and a length of about 7 mm.

5. The apparatus of claim 1 in which:

said radiation responsive crystal assembly includes a cadmium telluride crystal, having a said upwardly disposed surface with a substantially continuous conductive metal coating, and having a said lower disposed surface with a conductive metal coating separated into discrete regions, each said region defining a said segment; and said signal treatment network includes a contact assembly having a contact electrically coupled with each said discrete region for applying electrical bias thereto and conveying a discrete segment specific output therefrom from which said segment specific pulse output is derived, and an electrical coupling between said continuous conductive metal coating and electrical ground.

6. The apparatus of claim 5 in which said contact assembly includes an array of electrically conductive contact pins, each said pin being mechanically biased into contact with one said discrete region.

7. The apparatus of claim 1 in which said control and compiling system visually perceptive readout provides said segment count value for each said segment within a visually perceptible pattern corresponding with said crystal assembly predetermined pattern and in conjunction with an identification of each said segment corresponding with said indicia.

8. The apparatus of claim 1 in which:

said signal treatment network includes a plurality of signal treatment channels each providing one said segment specific pulse output;

said counting circuit includes a plurality of channel counters, each said channel counter being responsive to one said segment specific pulse output to derive a said segment count value; and said control and compiling system is responsive to said start command in the presence of an applied counting time interval value to derive said enable input in synchronization with said timing network actuation and is responsive to remove said enable input at the termination of a said time interval corresponding with said counting time interval value.

9. The apparatus of claim 1 in which said platform assembly includes a sample support located over said receiving region for receiving said tissue sample and rotatable about said receiving region from a first sampling orientation to an extent of 90° to a second sampling orientation.

10. The apparatus of claim 1 in which said crystal assembly comprises:

two, adjacently disposed arrays of said segments;

each said segment having a rectangular periphery of predetermined widthwise and lengthwise extent;

said segments within each said array being positioned in sequential mutual adjacency along said lengthwise extents;

said segments of said two adjacently disposed arrays being located in sequential alignment along the mutually adjacent widthwise extents thereof; and said adjacently disposed arrays forming a said predetermined pattern having a substantially rectangular outer periphery.

11. The apparatus of claim 10 in which said platform assembly includes a collimator positioned over said crystal assembly, having upstanding collimator fins formed of material non-transmissive of said photon emissions extending along the said lengthwise extents of each said segment rectangular periphery within said predetermined pattern rectangular outer periphery.

12. The apparatus of claim 11 in which said collimator is configured as a stacked sequence of rectangular polymeric spacers, mutually adjacent said spacers defining a sequence of spacer interfaces, and said collimator fins are located at and supported by said spacer interfaces to provide a sequence of said fins spaced apart a distance corresponding with said widthwise extent.

13. A method for locating the situs of photon emissions from a tissue sample, comprising the steps of:

providing a radiation responsive crystal assembly having a plurality of segments arranged in a predetermined pattern, each discretely responsive to said photon emissions interacting therewith to provide a segment specific output;

providing a radiation transmissive receiving region adjacent said crystal assembly having indicia identifying the location of each said segment;

positioning said tissue sample at said receiving region in a given orientation;

providing a signal treatment network responsive to each said segment specific output and deriving a segment specific pulse output corresponding with each valid said photon emission from said tissue sample at said receiving region;

counting the number of said segment specific pulse outputs occurring for a duration of sampling time to derive segment specific total count values;

displaying said segment specific total count values in conjunction with the said indicia corresponding thereto; and determining a location of said situs in correspondence with the highest said segment specific total count value for said given tissue sample orientation.

14. The method of claim 13 in which said step determining a location of said situs is carried out by locating said situs within said tissue sample over that select said segment from which said highest segment specific total count value is developed.

15. The method of claim 14 in which said step of determining a location of said situs is further carried out by locating said situs within said tissue sample over said selected segment at a position along said selected segment corresponding with the said segment specific total count value for those said segments located in adjacency with said selected segment.

16. The method of claim 15 in which said crystal assembly is provided as two, adjacently disposed arrays of said segments, each said segment having a rectangular periphery of predetermined widthwise and lengthwise extent, said segments within each said array being positioned in sequential mutual adjacency along said lengthwise extents, and said segments of said two adjacently disposed arrays being paired in sequential alignment along the mutually adjacent widthwise extents thereof.

17. The method of claim 16 including the step of collimating said photon emissions with respect to each said paired sequentially aligned segments.

18. The method of claim 14 including the steps of:

repositioning said tissue sample at said receiving region in a second orientation rotated a select extent with respect to said given orientation;

then counting the number of said segment specific pulse outputs occurring for a duration of sampling time to derive segment specific second total count values;

displaying said segment specific second total count values in conjunction with the said indicia corresponding thereto;

determining the location of said situs within said tissue over said selected segment in correspondence with the position of the segment highest of said second total count values.

19. A system for locating the situs of photon emissions from a tissue sample, comprising:

a radiation responsive crystal assembly having a plurality of segments discretely arranged in a predetermined pattern, responsive to said photon emissions interacting therewith to provide a segment specific output;

a platform assembly transparent to said photon emissions, positioned over said crystal assembly, having a receiving region for receiving said tissue sample located over said plurality of segments and having indicia identifying the location of each said segment;

a signal treatment network responsive to each said segment specific output for deriving a segment specific pulse output corresponding with each valid said photon emission from said tissue sample when positioned at said receiving region;

a controller circuit, responsive to a clock input and asynchronously assertable start and stop commands for respectively deriving an enable output synchronized with said clock input and a stop output;

a timer circuit responsive to said enable output to carry out a time interval measurement;

a counter network including a plurality of segment specific counters, each responsive in the presence of said enable output to count each said segment specific pulse corresponding with a predetermined said crystal assembly segment to provide a segment count value for each said segment;

a computer including a display under the control of said computer, including an interface circuit coupled with said controller circuit, said timer circuit and said counter network, responsive to a user input to derive said start and stop commands and for compiling and displaying each said segment count value at said display.

20. The system of claim 19 in which said segment count values are compiled and displayed by said computer at said display in a pattern emulating said crystal assembly predetermined pattern.

21. The system of claim 20 in which said segment count values are compiled and displayed by said computer in bar-chart format.

* * * * *